US012409476B2

(12) United States Patent
Shawver et al.

(10) Patent No.: US 12,409,476 B2
(45) Date of Patent: Sep. 9, 2025

(54) HIGH TEMPERATURE PRESSURE WASHING SYSTEM

(71) Applicant: Horizon Industrial Technologies, Inc., Brookshire, TX (US)

(72) Inventors: Todd Shawver, The Woodlands, TX (US); Tanner Bond, Houston, TX (US); Timothy Zawinsky, Brookshire, TX (US)

(73) Assignee: Horizon Industrial Technologies, Inc., Brookshire, TX (US)

( * ) Notice: Subject to any disclaimer, the term of this patent is extended or adjusted under 35 U.S.C. 154(b) by 0 days.

(21) Appl. No.: 18/807,437

(22) Filed: Aug. 16, 2024

(65) Prior Publication Data

US 2024/0399423 A1 Dec. 5, 2024

Related U.S. Application Data

(62) Division of application No. 18/632,085, filed on Apr. 10, 2024, now Pat. No. 12,076,761.

(60) Provisional application No. 63/495,285, filed on Apr. 10, 2023.

(51) Int. Cl.
*B08B 3/02* (2006.01)

(52) U.S. Cl.
CPC ........ *B08B 3/026* (2013.01); *B08B 2203/007* (2013.01); *B08B 2203/0241* (2013.01); *B08B 2203/027* (2013.01)

(58) Field of Classification Search
CPC ................ B08B 3/26; B08B 2203/007; B08B 2203/0241; B08B 2203/027
USPC .......................................................... 134/105
See application file for complete search history.

(56) References Cited

U.S. PATENT DOCUMENTS

| | | | | |
|---|---|---|---|---|
| 3,522,909 | A * | 8/1970 | Arant | F24H 1/165 126/362.1 |
| 4,219,155 | A | 8/1980 | Goerss | |
| 4,422,506 | A | 12/1983 | Bech | |
| 5,067,654 | A | 11/1991 | Paige | |
| 5,533,671 | A * | 7/1996 | Baer | B08B 3/026 239/10 |
| 5,662,269 | A | 9/1997 | Francis | |
| 5,713,310 | A | 2/1998 | Lemke | |
| 6,092,998 | A | 7/2000 | Dexter et al. | |
| 6,467,394 | B1 | 10/2002 | Wood et al. | |
| 7,370,706 | B2 | 5/2008 | Becker et al. | |
| 11,242,732 | B2 | 2/2022 | Salihbegovic | |
| 11,661,827 | B2 | 5/2023 | Burkart et al. | |
| 11,686,185 | B2 | 6/2023 | Salihbegovic | |
| 2002/0122730 | A1 | 9/2002 | Dexter et al. | |

(Continued)

FOREIGN PATENT DOCUMENTS

CN 201196062 2/2009

OTHER PUBLICATIONS

Cat Pumps, Flush-Style Plunger Pump System Design Guide, 2015, pp. 1-4.

(Continued)

*Primary Examiner* — Tinsae B Ayalew
(74) *Attorney, Agent, or Firm* — McAughan Deaver PLLC

(57) ABSTRACT

Low and medium pressure, high temperature, fluid washers for pressure cleaning surfaces, vessels, piping, tubing, and other structures having a tri-plex pump downstream of a fluid heater in which the high pressure pump employs a barrier seal system with circulating fluid.

24 Claims, 13 Drawing Sheets

(56) References Cited

U.S. PATENT DOCUMENTS

| | | | | |
|---|---|---|---|---|
| 2004/0131473 | A1 | 7/2004 | Lanfredi et al. | |
| 2005/0178410 | A1 | 8/2005 | Levy | |
| 2006/0174845 | A1 | 8/2006 | Thoma | |
| 2007/0262180 | A1 | 11/2007 | Adams | |
| 2010/0006668 | A1 | 1/2010 | Alexander et al. | |
| 2011/0036418 | A1 | 2/2011 | Hendy | |
| 2011/0131752 | A1* | 6/2011 | Place | E01H 1/103 134/105 |
| 2011/0171045 | A1 | 7/2011 | Gilpatrick et al. | |
| 2011/0232696 | A1 | 9/2011 | Barrios et al. | |
| 2014/0037467 | A1 | 2/2014 | Raasch | |
| 2014/0069659 | A1 | 3/2014 | Wang et al. | |
| 2014/0219842 | A1 | 8/2014 | Casella | |
| 2015/0191984 | A1 | 7/2015 | Albert | |
| 2015/0306614 | A1* | 10/2015 | Pierce | B05B 15/65 137/12 |
| 2018/0029056 | A1 | 2/2018 | Alexander et al. | |
| 2018/0071759 | A1 | 3/2018 | Steffen | |
| 2018/0369841 | A1 | 12/2018 | Fairchild | |
| 2019/0160497 | A1* | 5/2019 | Sanger | B08B 3/028 |
| 2019/0358682 | A1* | 11/2019 | Borghi | B08B 3/10 |
| 2021/0054725 | A1 | 2/2021 | Salihbegovic | |
| 2021/0086248 | A1 | 3/2021 | Salihbegovic | |
| 2021/0121907 | A1 | 4/2021 | Weik et al. | |

OTHER PUBLICATIONS

PCT-ISA, International Search Report and Written Opinion for PCT/US2024/023925, Jul. 24, 2024.

Zlatko Salihbegovic, Gas lift valve bellow crimping and protection from high dome and injection pressure, ALDC Gas Lift Workshop, Jun. 20-23, 2022, Houston, Texas, pp. 1-20, see particularity pp. 10-11.

PCT/US24/15161, International Search Report and Written Opinion of the International Searching Authority, Date of Mailing Jun. 10, 2024.

Google Patents English Translation CN20119606.

Schlumberger, Nova Gas Lift Valves, 2015.

Weatherford, Ultra-HP Wireline-Retrievable Injection-Pressure-Operated Gas-Lift Valve, 2016.

* cited by examiner

HIGH TEMPERATURE PRESSURE WASHING SYSTEM

CROSS REFERENCE TO RELATED APPLICATIONS

This application for patent claims benefit of and priority to U.S. patent application Ser. No. 18/632,085, filed on Apr. 10, 2024, issued as U.S. Pat. No. 12,076,761 and U.S. Provisional Patent Application No. 63/495,285, filed on Apr. 10, 2023, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present invention relates to low and medium pressure, high temperature, fluid pressure washers for pressure cleaning surfaces, vessels, piping, tubing, and other structures.

Description of the Related Art

High pressure fluid washing systems are used in a variety of operations, such as cleaning, pipe cleaning, cutting, removal of debris and coatings, to name a few. Most such systems include a fluid source, a drive assembly, a pressurization device, and water blasting equipment, such as a spray gun or spray lance.

The fundamental process is that energy in the form of high-pressure fluid can clean or strip a surface of contaminants by, among other mechanisms, mechanical impingement. Today, pressure washers range from low pressure models (e.g., less than about 2,000 psig (13.8 MPa)) to medium pressure models (greater than about 2,000 psig (13.8 MPa) to less than about 10,000 psig (70 MPa)) to high pressure models (greater than 10,000 psig (70 MPa) up to about 55,000 psig (379 MPa)).

Presently, pressure washers operating at pressures of about 5,000 psig (34 MPa) and higher are often restricted to mechanical or automated systems in which a human does not physically hold or control the water jetting equipment. It will be appreciated that water jetting equipment operating in excess of about 5,000 psig (34 MPa) generates significant reactive forces that may cause the operator to lose control of the jetting equipment, which may result in physical injury or death.

One way to increase the efficiency of contaminant removal or cleaning without increasing the fluid pressure is to add thermal energy to the system. While the mere act of fluid pressurization will increase the fluid temperature, there exist today commercially available low and medium pressure washers with additional fluid heating components. As the fluid temperature increases, component design becomes more complicated. As fluid temperature increases above the ambient phase change (at a particular pressure), additional considerations of safety and design arise. For example, conventional high temperature pressure washers heat the fluid after it leaves the high-pressure pump, rather than heating the fluid before the high-pressure pump. Pressurizing high temperature fluid poses an additional set of problems and issues on the high-pressure pump.

Examples of prior art pressure washers include U.S. Pat. No. 10,843,212, entitled *A Pressure Washer And A Method Of Providing A Super-Heated Jet Of Water*, which discloses that "[s]ome pressure washers include units for introduction of detergents and other chemicals into the water stream; however, it is desirable to obtain sterilized cleaning water without them, such that use in, for instance, food preparation processes can be implemented. With a sufficiently high temperature super-heated water stream, all process equipment, including pipework, that comes into contact with sterile process materials, can be cleaned, de-greased and sterilized both with the spray jet using water alone whilst not contributing endotoxins, microbial contamination or particles. Merely raising the temperature of water in a conventional pressure washer could cause components to fail, if they were not designed to operate at such high temperatures. In the present invention, the pump (25) supplies a relatively low volume of water at a relatively high pressure to the boiler (13), allowing the boiler (13) to heat that volume of water to a relatively high temperature. In contrast, if a higher volume of water were desired over a given time period, the pump would have to supply it at a comparatively lower pressure (which is undesirable) and/or the boiler would only be able to heat it to a comparatively lower temperature over that same time period (which is also undesirable). Increased working temperatures on a hose (3) will reduce its maximum working pressure; however, by using a PTFE hose as in the present invention, the maximum working pressure at 170 [degrees 338° F.] may be up to 17 MPa [2,466 psi]."

US published application no. 2019/0160497 entitled *Hot Water Pressure Washer* discloses, now abandoned, "[a] hot water pressure washer employs a high-pressure pump for generating a stream of high-pressure fluid and a hydrodynamic heater operable for heating the fluid stream. The hydrodynamic heater includes an inlet port fluidly connectable to a fluid source and an outlet port fluidly connected to an inlet port of the high-pressure washer. An outlet port of the high-pressure washer is connectable to a handheld wand operable for discharging the fluid stream to atmosphere. A prime mover provides rotational torque for driving the hydrodynamic heater and the high-pressure pump. An unloader valve is used to control distribution of the fluid stream discharged from the high-pressure pump. An exhaust gas recovery heat exchanger operates to transfer heat from the prime-mover exhaust gas to the fluid stream. A pre-heat tank is used to temporarily store a quantity of heated fluid for future use."

U.S. Pat. No. 9,285,040 entitled *High Pressure Fluid System* discloses "[a] high pressure fluid system including enhanced safety, maintenance and servicing features. The system can include a CAM assembly module, having a valve seat assembly, seal cartridge assembly and inlet manifold, that is easily installed in and removed from a frame and/discharge manifold as a single unit. A discharge manifold can isolate different pressure rated passageways of the system, and multiple rupture discs associated with the same. A discharge manifold end plate can be included to provide ease of repair of discharge outlets and to establish a plumbing system for the rupture discs. A quick coupler can facilitate connection between a plunger of the seal cartridge assembly and a cross head stub connected to a power frame. A lubrication valve assembly can provide and meter lubrication from a high pressure inlet source to a plunger and packing of the seal cartridge assembly."

The inventions disclosed herein are directed to improved medium and high pressure, high temperature pressure washers and methods of use.

BRIEF SUMMARY OF THE INVENTION

A brief summary of the inventions that indicates their nature and substance may be understood from the scope of the subject matter encompassed by the appended claims and their equivalents, which are incorporated herein by reference for all purposes of this summary. Also, a brief summary of the inventions that indicates their nature and substance may be understood from the scope of the subject matter encompassed by any claims that may be issued from this application and their equivalents, which claims also are incorporated herein by reference for all purposes of this summary. This Brief Summary Of The Invention is not intended to and does not summarize all the inventions that are enabled by this specification.

BRIEF DESCRIPTION OF THE SEVERAL VIEWS OF THE DRAWINGS

The following figures form part of the disclosure of inventions and are included to demonstrate further certain aspects of the inventions. The inventions may be better understood by reference to one or more of these figures in combination with the detailed description of certain embodiments presented herein.

Figure 1:
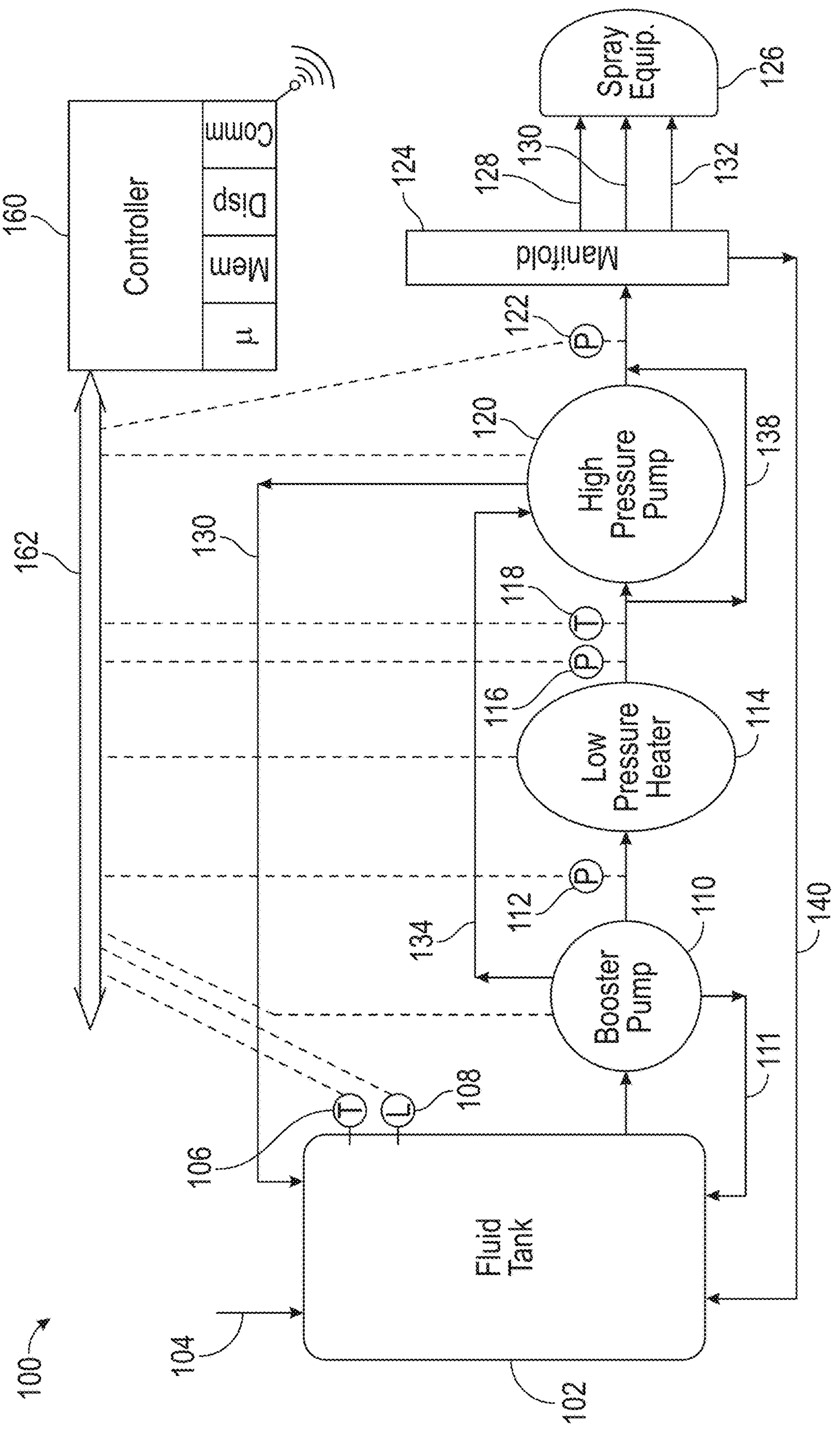
FIG. 1 illustrates the various components, plumbing, and instrumentation one of the many possible embodiments of a high temperature, medium and high-pressure washer system according to our inventions.

While the inventions disclosed herein are susceptible to various modifications and alternative forms, only a few specific embodiments have been shown by way of example in the drawings and are described in more detail below. The figures and detailed descriptions of these embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts illustrated and taught by the specific embodiments.

DETAILED DESCRIPTION

The figures described above, and the written description of structures and functions below, are not presented to limit the scope of the inventions disclosed herein, or the scope of the appended or issued claims. Rather, the figures and written description are provided to teach a person skilled in this art to make and use the inventions for which patent protection is sought.

A person of skill in this art that has benefit of this disclosure will understand that the inventions are disclosed and taught herein by reference to specific embodiments, and that these specific embodiments are susceptible to numerous and various modifications and alternative forms without departing from the inventions we possess. For example, and not limitation, a person of skill in this art that has benefit of this disclosure will understand that the figures and/or embodiments that use one or more common structures or elements, such as a structure or an element identified by a common reference number, are linked together for all purposes of supporting and enabling our inventions, and that such individual figures or embodiments are not disparate disclosures. A person of skill in this art having benefit of this disclosure immediately will recognize and understand the various other embodiments of our inventions having one or more of the structures or elements illustrated and/or described in the various linked embodiments. In other words, not all embodiments of our inventions are described or illustrated in this application, and one or more of the claims to our inventions may not be directed to a specific, disclosed example. Nonetheless, a person of skill in this art that has benefit of this disclosure will understand that the claims are fully supported by the entirety of this disclosure.

People skilled in this art will appreciate that not all features of a commercial embodiment are described or shown for the sake of clarity and understanding. Persons of skill in this art will also appreciate that the development of an actual commercial embodiment incorporating one or more aspects of the present inventions will require numerous implementation-specific decisions to achieve the developer's ultimate goal for the commercial embodiment. Such implementation-specific decisions may include, and are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art that have benefit of this disclosure.

Further, the use of a singular term, such as, but not limited to, "a," is not intended as limiting of the number of items. The terms "a," "an," and "the" also refer to "one or more" unless expressly specified otherwise. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the scope of what is claimed.

Reference throughout this disclosure to "one embodiment," "an embodiment," or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all the items are mutually exclusive and/or mutually inclusive, unless expressly specified otherwise.

Furthermore, the described features, structures, or characteristics of one embodiment may be combined in any suitable manner in one or more other embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

The description of elements in each figure may refer to elements of proceeding figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or simultaneously, or the operations may be executed in the reverse order, depending upon the functionality/acts/structure involved or desired.

In general, we have invented improved medium to high pressure, high temperature pressure washers in which a booster pump, such as reciprocating pump, multi-stage reciprocating pump, centrifugal pump, positive displacement pump or the like, draws a fluid, such as, but not limited to, ambient temperature water, or a water-based cleaning solution, from a replenishable source and pressurizes the fluid about 55 psig (379 kPa) to about 200 psig (1,379 kPa) and preferably to between about 90 psig (621 kPa) and about 180 psig (1,241 kPa). The outflow of the booster pump (i.e., low pressure fluid) may be communicated to a fluid heater, such as a direct fired, or electrical heater, so that the temperature of the incoming pressurized fluid is increased above ambient to between about 180° F. (82° C.) and about 375° F. (191° C.), and preferably between about 200° F. (93° C.) and about 325° F. (163° C.). In one preferred embodiment, the booster pump may be controlled, such as by an operator or a controller, such that that the low-pressure fluid leaving the booster pump has a pressure greater than the vapor pressure of the fluid exiting the heater. For example, if the system is configured to heat water to 180° F. (82° C.), the booster pump may be set, controlled, or operated to pressurize the fluid to greater than about 55 psig (379 kPa) and preferably to about 90 psig (621 kPa), so that the heated water remains in its liquid state within system. For 325° F. (163° C.) fluid, the booster pump may pressurize the water to greater than about 135 psig (931 kPa), and preferably to about 180 psig (1,241 kPa). It is preferred, but not required, that the booster pump not pressurize the fluid to greater than about 250 psig (1,724 kPa).

It will be appreciated that a fluid heater operating at 250 psig (1,724 kPa) or less is easier and cheaper to design, build, and safer to operate than a fluid heater that operates at 250 psig (1,724 kPa) or higher. In our inventions, the low pressure, heated water may be passed to a medium and/or high-pressure pump that increases the fluid pressurization to between about 2,500 psig (17 MPa) and about 5,000 psig (34 MPa) (e.g., medium pressure, high temperature fluid) or to between about 5,001 psig (34 MPa) and about 10,000 psig (70 MPa) (e.g., high pressure, high temperature fluid), at flow rates from about 1 gpm (3.8 l/min) up to about 10 gpm (37.9 l/min). Suitably modified direct acting reciprocating piston or plunger pumps, such as triplex pumps or the like, may be suitable for this application. The medium or high pressure and heated fluid is then passed to a manifold for distribution to fluid washing/blasting equipment, such as one or more spray nozzles or spray lances, to provide hot, pressurized fluid, such as steam or wet steam, for cleaning.

In one of the many possible embodiments of our inventions, the medium/high pressure pump preferably comprises a barrier fluid seal around each plunger through which a barrier fluid, such as water, is continuously circulated during pump operation to provide cooling to the pump, and/or to evacuate any leakage from the pump seal systems. The volume and flow rate of the barrier fluid preferably maintains a substantially constant temperature in the chamber prohibiting any leakage from the inboard seal systems to flash to vapor. Even in catastrophic conditions, the barrier fluid may prohibit the pressurized fluid from flashing to vapor. In addition, the circulating barrier fluid may provide cooling to the plunger and other pump components.

Further, the medium/high pressure pump may have a spring-biased inlet valve assembly with a low opening force (aka cracking pressure) to reduce the opening velocity of the fluid entering through the valve. The discharge valve assembly also may comprise a biasing spring with a low opening force that promotes immediate or substantially instantaneous actuation when the plunger/piston begins its forward (compressive) motion. The main seal of the pressure pump (e.g., each plunger bore) is preferably made of a PEEK material, which is manufactured, or machined to an interference fit with the bore of the plunger stuffing box and the plunger/piston. Once the high-pressure pump begins operation, the interference fit of the seal changes or wears to a zero-clearance fit with the plunger.

Turning now to more detailed descriptions of one of the many possible embodiments incorporating one or more aspects of our inventions, FIG. 1 illustrates a general system overview of a high temperature pressure washing system 100. The system 100 may be deployed on a truck bed, skid, trailer, or other fixed or mobile platform (not shown). Regardless of the platform, a fluid tank 102 may be provided having a volume sufficient to provide fluid for the system 100. The tank 102 may have a continuous or batch fluid inlet supply 104, such as a water supply. Although not shown in FIG. 1, the inlet 104 may comprise a pre-filter, such as a replaceable bag filter to condition the incoming water by removing contaminants. Preferably, the tank 102 is open to atmosphere (i.e., preferably it is not a pressurized tank) and is fabricated from polypropylene or other suitable plastic, composite, or metallic material. Preferably, the tank 102 has a fluid temperature sensor 106 and fluid level sensor 108 to indicate when the fluid level in the tank 102 drops to a predetermined level. An outlet from the tank 102 may comprise an additional filter, such as a mesh filter to prevent any particulate matter from entering the pumps.

Fluid from the tank 102 may be passed to a booster pump 112, such as described above, that pressurizes the fluid from atmospheric conditions to a pressure level of between about 100 psig (689 kPa) and less than about 250 psig (1,724 kPa), which for purposes of this disclosure is considered to be low pressurization. A purpose of the booster pump 110 may be to pressurize the fluid above its vapor pressure throughout the system 100 (excluding when the fluid exits the system 100 at wand or lance). In other words, because the temperature of the fluid in the system 100 is increased before the fluid reaches the high-pressure pump 120, the booster pump 110 creates pressurization so that the fluid is always above its vapor pressure. In one embodiment, the booster pump 110 may be run at a pressurization that ensures the fluid will not enter the vapor state within the system 100. A pressure sensor 112, such as an analog pressure gage and/or digital pressure transducer, may indicate or transduce fluid pressure into observable or usable signals.

The low-pressure fluid may leave the booster pump 110 and enter a low pressure heater 114 to increase the thermal energy or temperature of the low-pressure fluid. The heater 114 may be a direct fired heater, such as a Diesel heater, natural gas heater or LPG heater, or may be an electric heater, such as a resistance or induction heater, a microwave heater, or other type of fluid heater. The heater or heating system 114 also may capture waste heat such as flue gas heat, or from other components, such as an internal combustion engine or that powers the system 100 (e.g., exhaust gas heat). Regardless of the type of heater 114 employed, the heater 114 is structurally configured to raise the temperature of the fluid to at least about 200° F. (93° C.) and up to about at least 250° F. (121° C.) and, and preferable up to about 325° F. (163° C.) at flow rates from about 1 gpm (3.8 l/min) to about 10 gpm (37.9 l/min) or more. For purposes of the embodiment of FIG. 1, the heater 114 may comprise a Diesel, direct-fired heater of about 700,000 BTUs, which can raise the fluid temperature to about 200° F. (93° C.) at 10 gpm (37.9 l/min) and to about 312° F. (156° C.) at 1 gpm (3.8 l/min). It is preferred that the pressure and temperature of the heated fluid is measured or transduced 116, 118, such as by analog gages or digital transducers, downstream of the heater 114.

The heated, low-pressure fluid (i.e., the fluid exiting the heater 114) may then be passed from the heater 114 to a high-pressure pump 120 structurally configured and organized to raise the pressure of the low pressure, heated fluid to between about 2,500 psig (17 MPa) and about 10,000 psig (70 MPa). A conventional triplex pump, such as those available from Heritage pumps, modified as disclosed herein, may be employed as the high-pressure pump 120. The pressure of the fluid exiting the high-pressure pump 120 is preferably measured or transduced 122 and passed to a distribution manifold 124 that distributes the high temperature, medium, or high-pressure fluid to spray washing equipment 126, such as one or more spray guns or spray lances (not shown).

This system 100 may be designed to provide the user/operator with the ultimate in flexibility when pressure cleaning at pressures up to and including 10,000 psig (70 MPa), flows up to and including 10 gpm (37.9 l/min), and temperatures up to and including 312° F. (156° C.). The system 100 may be designed to provide a safer way to handle high temperature pressurized water including steam and wet steam by heating the fluid through the heating system before it is pressurized to about 2,500 psig (17 MPa) or to up about 10,000 psig (70 MPa). The high-pressure pump 120 is preferably designed and configured to tolerate both the Maximum Allowable Working Pressure (MAWP) of about 10,000 psig (70 MPa) and a Maximum Allowable Working Temperature (MAWT) of about 375° F. (191° C.).

Embodiments of high temperature pressure washer systems, including that embodiment 100 illustrated in FIG. 1, may also comprise a pressure relief line 111 from the booster pump 110 back to the tank 102 to maintain the low-pressure fluid at the desired pressure level. For example, a hydraulic motor (not shown) driven by an auxiliary power-take-off from a stationary engine may control the pressurization of the booster pump 110, and the relief line 111, which may include a settable or controllable pressure relief valve, may maintain the fluid pressure at the desired level.

Additionally, or optionally, embodiments also may comprise a low temperature mode in which low pressure fluid from the booster pump 110 transits through an un-energized heater 114 to the high-pressure pump 122 to provide unheated pressurized fluid. Alternately or optionally, embodiments may comprise a controllable conduit (not shown) that bypasses the heater 114 entirely.

Embodiments of pressure washers may also comprise a low pressure, high temperature mode in which high temperature, low pressure fluid bypasses the high-pressure pump 120. For example, a controllable bypass conduit 138 (such as through controllable valves) may communicate the low pressure heated fluid to the manifold 124 bypassing the high-pressure pump 120.

As illustrated in FIG. 1, a manifold 124 may accept the pressurized fluid (whether low pressure, high temperature; high pressure, high temperature; or high pressure, low temperature) and distribute such fluid to spray equipment 126. For example, output 128 may provide low temperature, high pressure fluid, output 130 may provide high pressure, high temperature fluid, and output 132 may provide high temperature, low pressure fluid. Alternately, each output 128, 130, 132, . . . may distribute the same pressurized and/or heated fluid. An unloading conduit 140 may return pressurized fluid not distributed to the spray equipment 126 to the tank 102.

As will described in more detail below, a portion of the booster pump 110 output may be, and preferably is, communicated to the high-pressure pump 120 for use with the barrier fluid seal. For example, a conduit 134 may communicate a portion of the pressurized fluid, such as about 1.5 gpm (5.7 l/min) or about 2 gpm (7.6 l/min) or more, from the booster pump 110 to the high-pressure pump 120 and return the fluid to the tank 102 via conduit 136.

It will be appreciated that embodiments of our inventions may be manually controlled or automatically controlled. By manually controlled, we mean using analog pressure and temperature gages or digital display gages, manual valves, and other operator controlled components. Automatic control may comprise a controller 160 having a microprocessor and/or logic board, memory, a human interface device and/or display, a communication module, and a, preferably, a bi-directional communication system, such as but not limited to a data bus 162.

In FIG. 1, the dashed lines represent data communication pathways, whether wired or wireless, such as, for example, between pressure transducer 112 and controller 160. These communication pathways can be unidirectional, for example, transmitting data from a transducer to the controller 160, or bi-directional transmitting data to the controller 160 and control signals from the controller 160, such as for a controllable valve.

It is contemplated that the controller 160 may transmit and/or receive data wirelessly, such as by electromagnetic transmission, including the Bluetooth® protocol, other packet-based protocols, and even analog protocols. For example, the controller may communicate to remote computers for monitoring and/or controlling the system 100. Additionally, or optionally, the controller 160 may transmit operational information to the Internet for access by remote or adjacent computers for monitoring and/or controlling the system 100.

Persons of skill will appreciate that embodiments like that illustrated as system 100 will require a power source to drive the booster pump 110, the high-pressure pump 120, other equipment, and, optionally, the heater 114. A preferred embodiment may use a Diesel engine, such as, but not limited to, a Kubota 07 series industrial Diesel engine producing about 55 KW of power. The high-pressure pump 120 may be disengageably driven by the engine power take off, and a hydraulic pump connected to the engine may drive the booster pump 110.

Figure 2A:
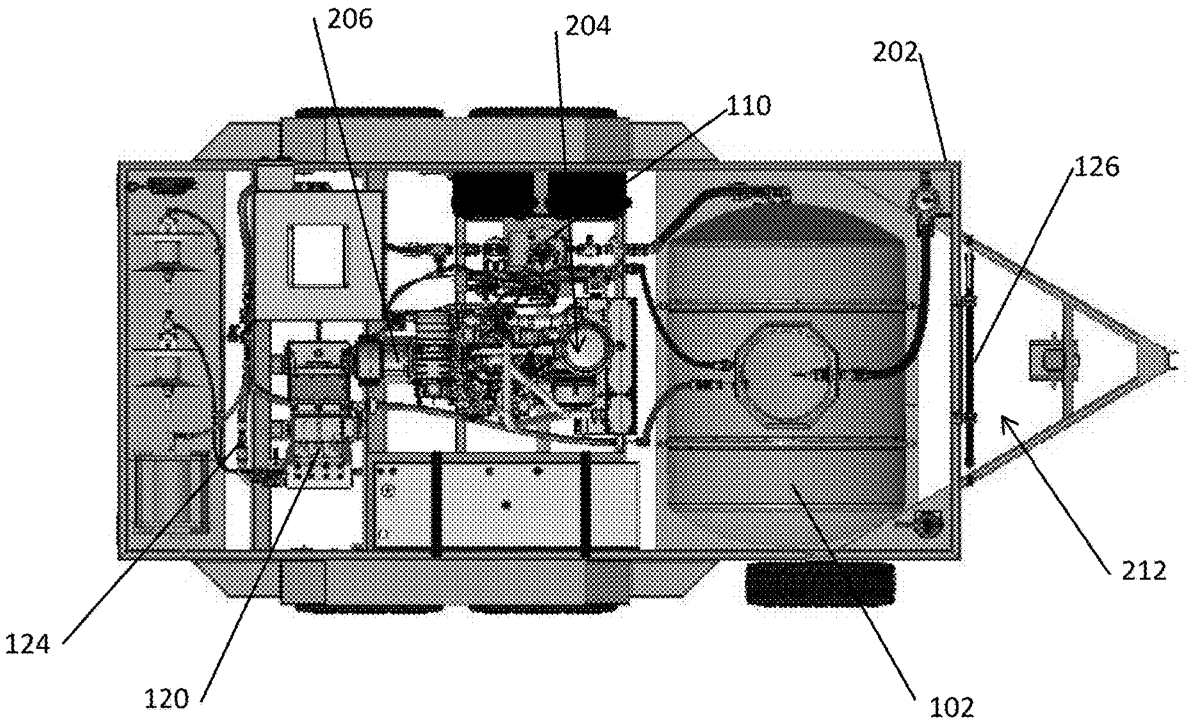
FIGS. 2A and 2B illustrate an embodiment of a pressure washer system according to the present inventions disposed on a trailer.
Figure 2B:
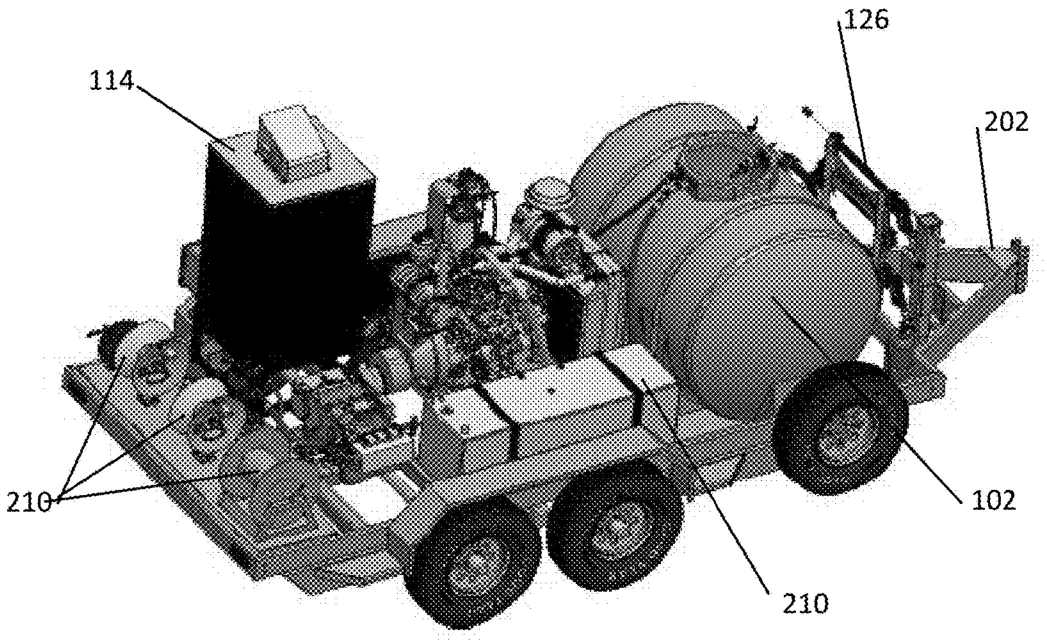

FIG. 2 illustrates a high temperature, high pressure system, such as system 100, deployed on a trailer 202. FIG. 2 shows a fluid tank 102, a power source 204, such as a Diesel engine, a direct-fired, Diesel-fueled heater 114, a Diesel fuel tank 210, a high pressure pump 120 engageably coupled to a power-take-off (PTO) 206 associated with power source 204. Also illustrated is a manifold 124, reels 210 to house the wand or lance hoses (not shown) and storage for wands or lances 212.

Figure 3:
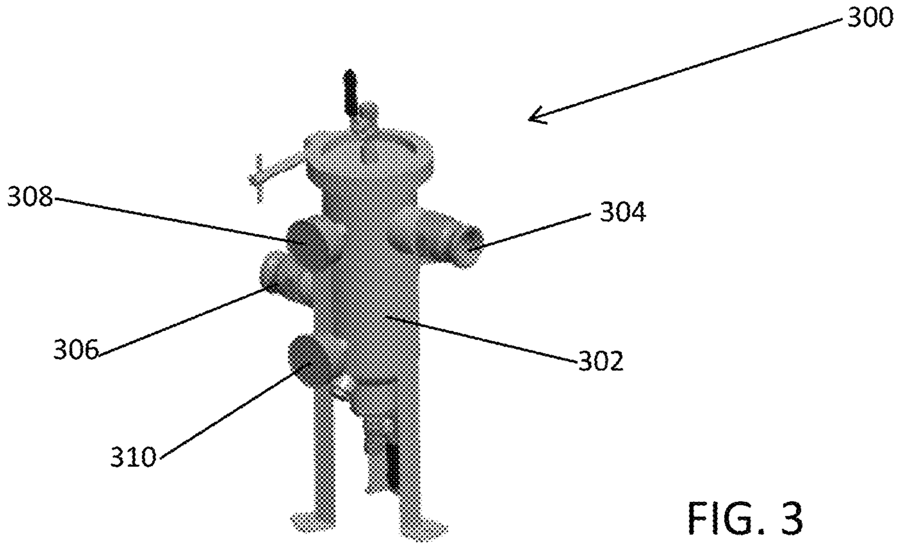
FIG. 3 illustrates a pre-filter suitable for use with the present inventions.

Having now described certain general aspects of high temperature systems according to our inventions, we now turn to descriptions of various components that may be used as desired with various other embodiments. FIG. 3 illustrates a filter assembly 300 that may be used as a pre-filter to remove debris or other contaminants from fluid entering the fluid tank. The filter housing 302 comprises an inlet 304 and filtered outlet 306 and may utilize inlet 308 and outlet 310 pressure gauges or transducers to measure a differential pressure across the filter. The illustrated filter assembly 300 is preferably a replaceable bag filter system. For example, and not limitation, in a continuous (as opposed to a batch supply) fluid supply system, inlet 304 may be coupled to a water supply system.

Figure 4:
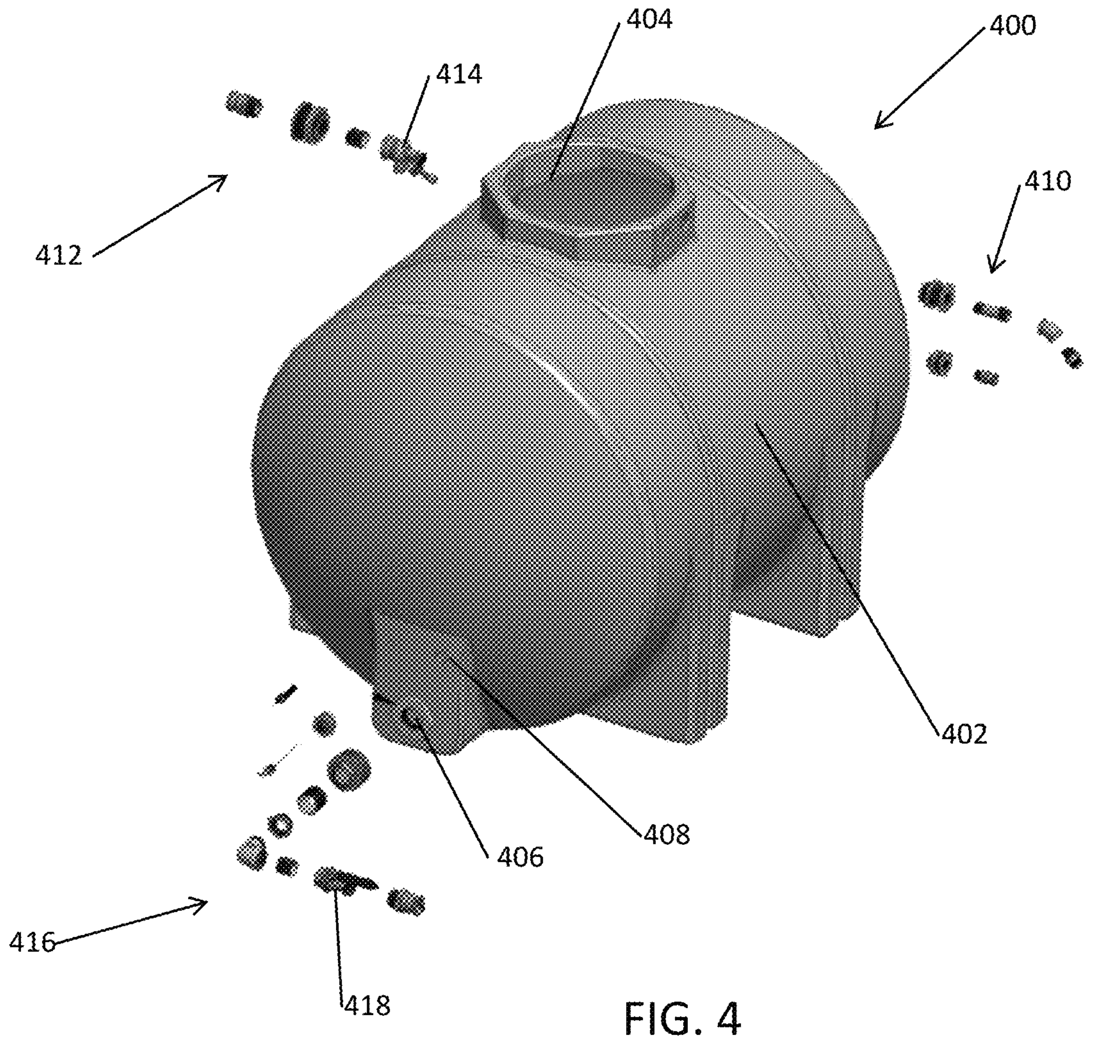
FIG. 4 illustrates a fluid tank suitable for use with the present inventions.

FIG. 4 illustrates a fluid tank system 400, which may be the tank 102 of FIG. 1, comprising a body 402 defining a volume and having an inlet 404 and an outlet 406 The tank 102 may comprise one or more sensor ports 408 into which a low-level fluid switch may be mounted and/or a temperature probe, such as an RTD probe, may be mounted. As discussed previously, if utilized, these sensors may communicate with a controller.

The tank may be fabricated from any convenient material or combination of materials including metals, plastics, and/or composites. It will be appreciated if tank recirculation conduits 410 are employed, such as conduits 136 or 140 illustrated in FIG. 1, the temperature of the fluid in the tank 102 may increase during operation. The maximum temperature of the fluid allowed in the tank 102 likely will be based on the material from which the tank is made. For example, for a polypropylene tank 102, the temperature of the fluid in the tank may be limited to about 180° F. If the tank fluid temperature exceeds that limit, the controller or operator may intervene and shut down system operation, such returning the stationary engine to idle or simultaneously draining and filing the tank 102 to reduce the fluid temperature.

FIG. 4 illustrates a fluid inlet system 412 comprising a level control 414 such as a mechanical float valve (float not shown) that may be used with tank inlet 404 to maintain a fluid level in the tank 402. It will be appreciated that the outlet 306 of pre-filter 300 may be coupled to the inlet system 412. A fluid outlet system 416 is coupled to the tank 102 outlet 406 and may comprise a manual or controllable valve, such as a ball valve 418 and/or a strainer (not shown).

Figure 5:
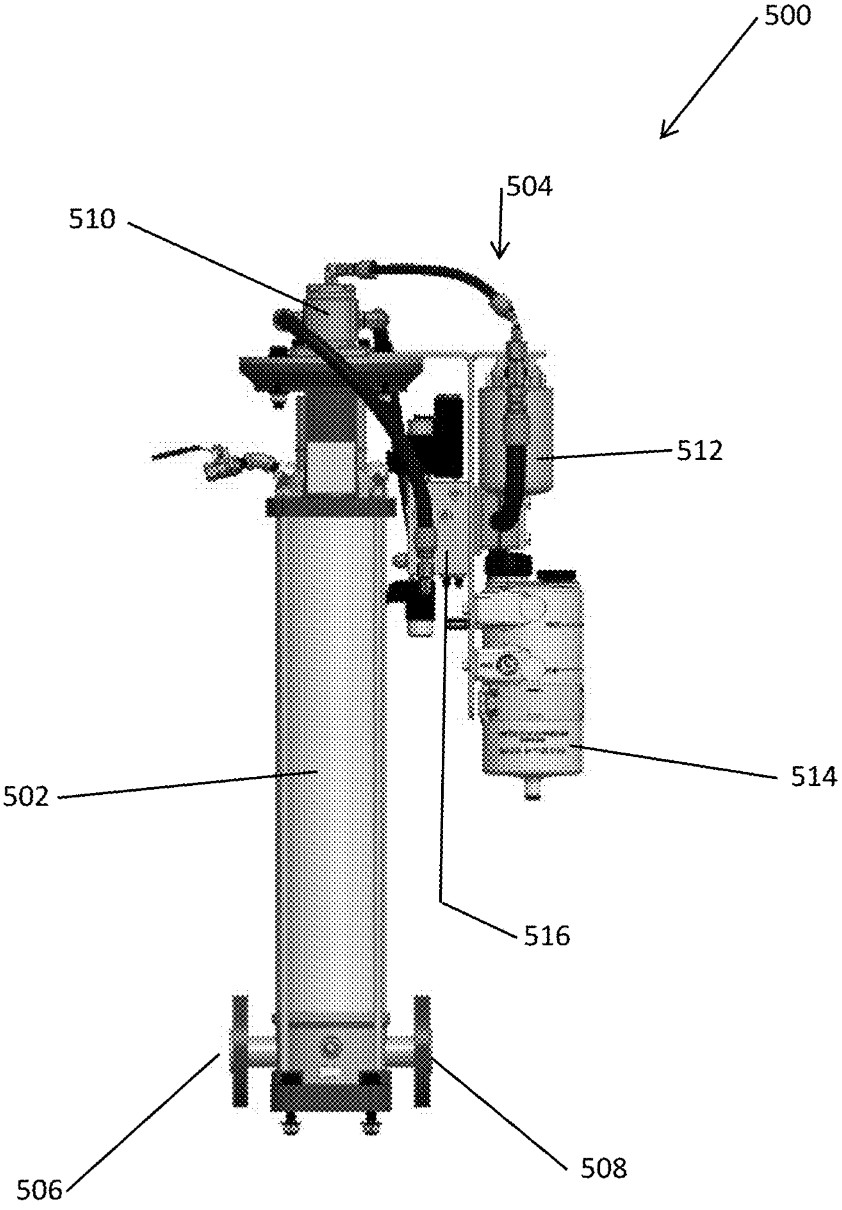
FIG. 5 illustrates a booster pump suitable for use with the present inventions.

FIG. 5 illustrates a booster pump assembly 500, suitable for use with embodiments of our inventions. The booster pump assembly 500 comprises a vertical, multi-stage reciprocating pump 502, which has been modified with a hydraulic drive system 504. As discussed previously, the booster pump 502 inlet 506 may draw fluid from the tank and expel pressurized fluid up to pressures of between about 55 psig (379 kPa) up to about 250 psig (1,724 kPa), and preferably of between about 90 psig (621 kPa) and about 180 psig (1,241 kPa), and with flow rates of up to about 12 gpm (45.4 l/min) through outlet 508.

The hydraulic drive system 504 may comprise a hydraulic drive or motor 510, a hydraulic fluid filter 512, a reservoir 514, such as a cyclone reservoir, for removing entrained air in the hydraulic fluid, a manifold 516, and associated hoses or plumbing.

A hydraulic pump (not shown) may be coupled to the stationary engine, such as to an auxiliary PTO, for supplying pressurized hydraulic fluid to the drive system 504. As is known, hydraulic drive systems typically raise the temperature of the hydraulic fluid during operation. If needed, a fluid to air or fluid to fluid heat exchanger may be incorporated in the hydraulic system to remove heat from the hydraulic fluid. For example, and without limitation, a counter-flow, plate heat exchanger may be employed through which hydraulic fluid passes in one direction while pressurized fluid from the tank or the booster pump passes through in the opposite direction. The tank or pressurized booster pump fluid removes heat from the hydraulic fluid and the heated fluid can be returned to the tank. Alternately or optionally, embodiments of our inventions can use waste heat from the hydraulic fluid to heat the pressure washing fluid thereby reducing the size of or even eliminating an additional heater, such as heater 114 in FIG. 1 or heater 600 in FIG. 6.

Alternately, rather than a hydraulically driven booster pump, the system may utilize electrical motors, such as radial flux or axial flux motors and linear motors. For example, the power source 204 in FIG. 2 may be a Diesel genset.

Figure 6:
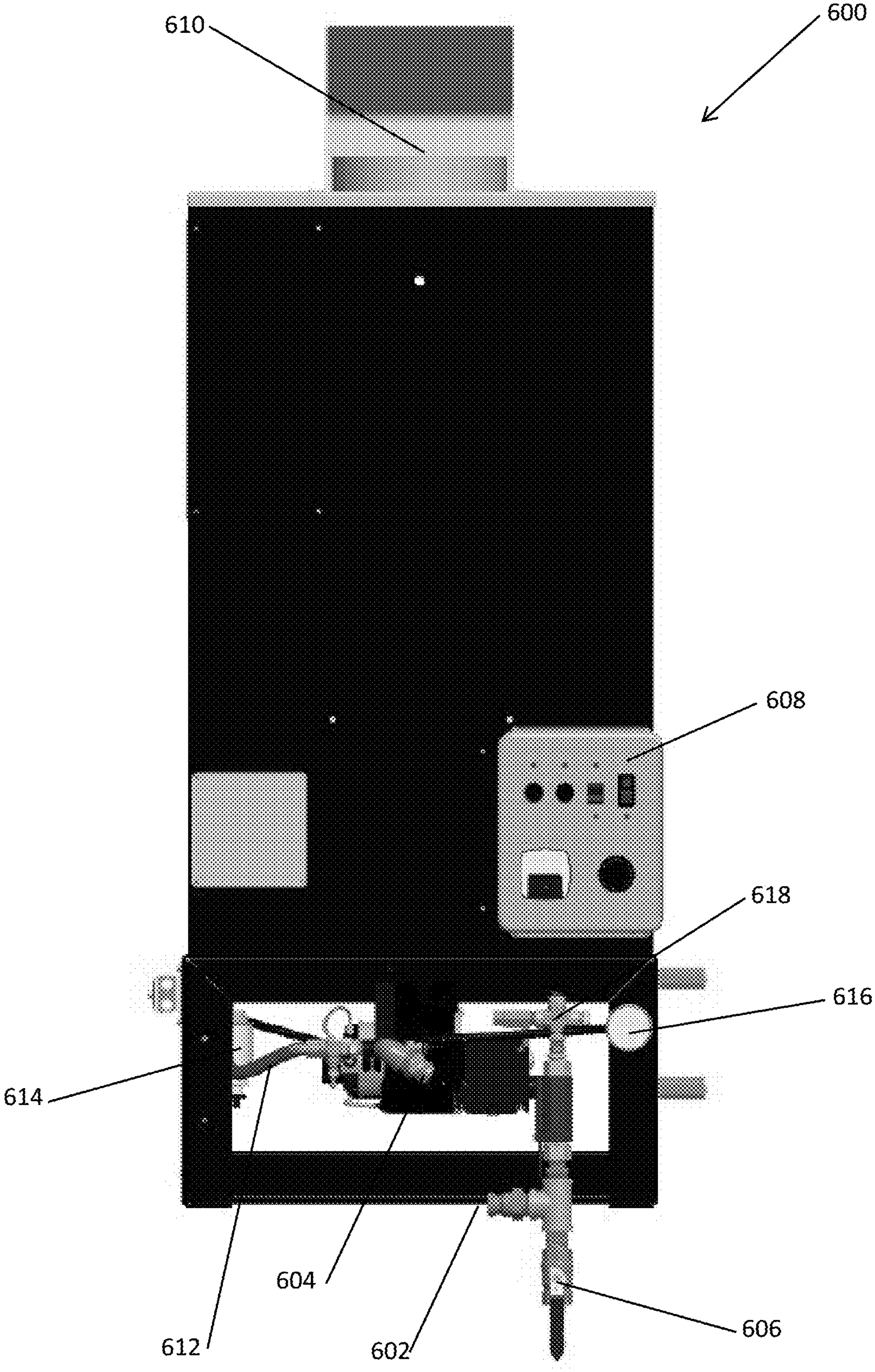
FIG. 6 illustrates a Diesel heater suitable for use with the present inventions.

FIG. 6 illustrates a fluid heater 600 suitable for use with the present inventions. The heater 600 illustrated in FIG. 6 is a Diesel fuel, tube to air heat exchanger, such as those available from the DynaBlast division of the John Brooks Company. For example, and not limitation, a Diesel fuel heater may comprise about 250 feet (76.2 m) of schedule 80 tubing through which pressurized fluid, such as fluid from the booster pump 500, flows and gains heat from the Diesel fuel combustion products passing over the tubing. A heat exchanger such as described may experience a pressure drop from inlet to outlet of about 50 psig (345 kPa) to about 55 psig (379 kPa).

FIG. 6 shows a fluid inlet 602 including a drain valve 606, a heated fluid outlet 604, burner controller 608, and vent hood 610. A Diesel fuel inlet 612, a Diesel fuel water separator 614 and fuel pressure gage 616 is also shown. It is contemplated that a heater like that illustrated in FIG. 6 can raise the temperature of fluid, such as water, from about ambient to about 200° F. (93° C.) at a flow rate of about 10 gpm (37.9 l/min), and from about ambient to about 312° F. (156° C.) at a flow rate of about 5 gpm (19 l/min). As discussed previously, it is preferred that a booster pump, such as pump 500, raises the pressure of the incoming fluid to a pressure that exceeds the vapor pressure of the fluid that exits the heater 600. FIG. 6 also illustrates a pressure relief valve 618 on the fluid inlet to prevent over pressurization of the heater.

Figure 7:
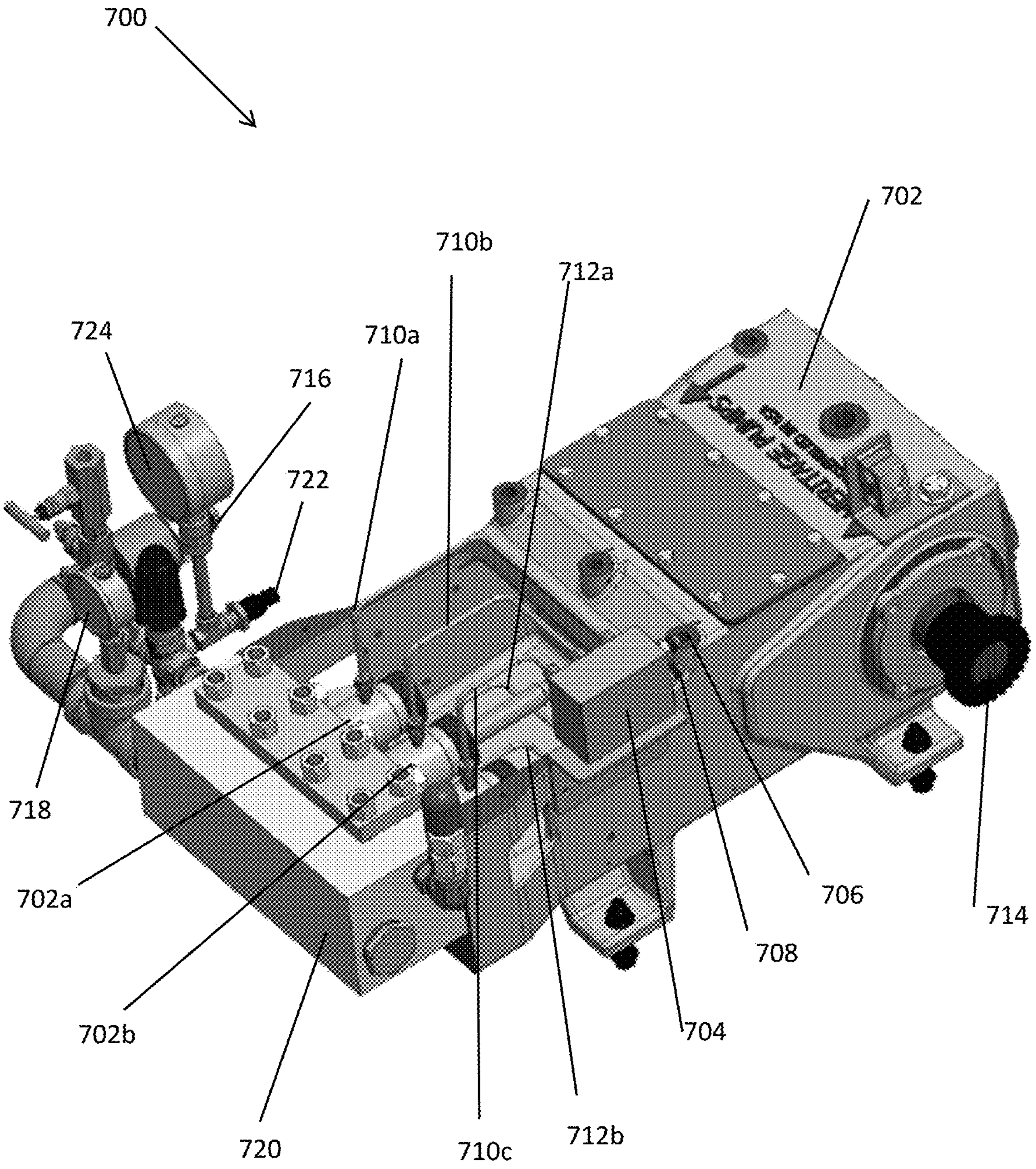
FIG. 7 illustrates a modified high-pressure triplex pump suitable for use with the present inventions.

FIG. 7 illustrates a high-pressure pump 700 suitable for use with embodiments of our inventions. For example, and not limitation, pump 700 may comprise a triplex reciprocating plunger pump 702, such as a Heritage Pump Company Model HT-28 reciprocating pump, modified as described herein. As will be described in more detail with respect to FIGS. 8-11, a conventional reciprocating plunger pump 702 typically utilizes only one seal set. To promote safety and maintain the fluid from flashing to vapor if a leak occurs across the seal set, our inventions contemplate modifying conventional reciprocating plunger pumps to utilize a barrier fluid seal in which fluid is continuously circulated thru an annular chamber in each plunger cylinder or stuffing box 702*a*-702*c*. Also, the stuffing boxes 702*a*-702*c* may have an inside diameter that is slightly tapered or enlarged toward the cylinder end such that any entrained gases or air in solution with the fluid may escape and not buildup in the stuffing box.

FIG. 7 illustrates a barrier fluid manifold 704 having a barrier fluid manifold inlet or return 706, a barrier fluid manifold outlet 708 or supply and a set of barrier seal fluid return conduits 710*a*-710*c*, and a set of barrier seal fluid supple conduits 712*a*, 712*b* (712*c* not shown) for each stuffing box 702*a*-702*c*. It is preferred that the fluid, such as water, circulated through these conduits come from the booster pump 500, which means the barrier seal fluid likely will be at pressurized at substantially ambient temperatures, with perhaps some marginal heating from the booster pump action. The temperature differential between the fluid in the return conduits 710*a*-710*c* and supply conduits 712*a*-712*c* may be measured or transduced, individually or commonly, such as at the manifold 704. It will be appreciated that if a seal system in the high-pressure pump 702 leaks heated fluid, the barrier fluid seal will capture the leak causing the barrier fluid leaving the barrier fluid seal to experience a temperature increase. This temperature increase can signal a pump leak and allow the operator and/or controller to intervene, such as by disengaging the high-pressure pump from the stationary engine and/or returning the engine to idle. Additionally, or optionally, rather than measuring or transducing a differential temperature across the conduits, the temperature of the outlet conduits or the manifold itself may be measured or transduced to detect an increase in temperature cause by a leak. Additionally, or optionally, the pressure in the barrier fluid seal chamber can be measured or transduced to detect if a non-heated leak has occurred.

The pump 700 may comprise a PTO coupling 714 that is coupled to the stationary engine or coupled though a gear box or transmission. It is preferred that the pump 700 is engageable and disengageable from the stationary engine as desired or required. For example, a hydraulic cylinder (not shown) may be used to engage a PTO lever on the power source 204 to engage and disengage the high pressure pump 700 from the PTO 206. It is preferred that a disengagement lockout be employed to prevent the PTO from prematurely or inadvertently disengaging from the pump 700. For example, if a hydraulic actuation cylinder is employed, a hydraulic circuit with necessary check valves can be used to prevent cylinder from unintentionally backing off, or a mechanical lock can be employed to retain the cylinder in the engaged position until it is desire to de-energize the pump 700.

A fluid inlet 716 with pressure gage or transducer 718 is illustrated feeding fluid, such as heated fluid from the heater to the high-pressure cylinder 720. A high-pressure fluid outlet 722 and associated pressure gage or transducer 724 is shown exiting the cylinder head 720.

Figure 8:
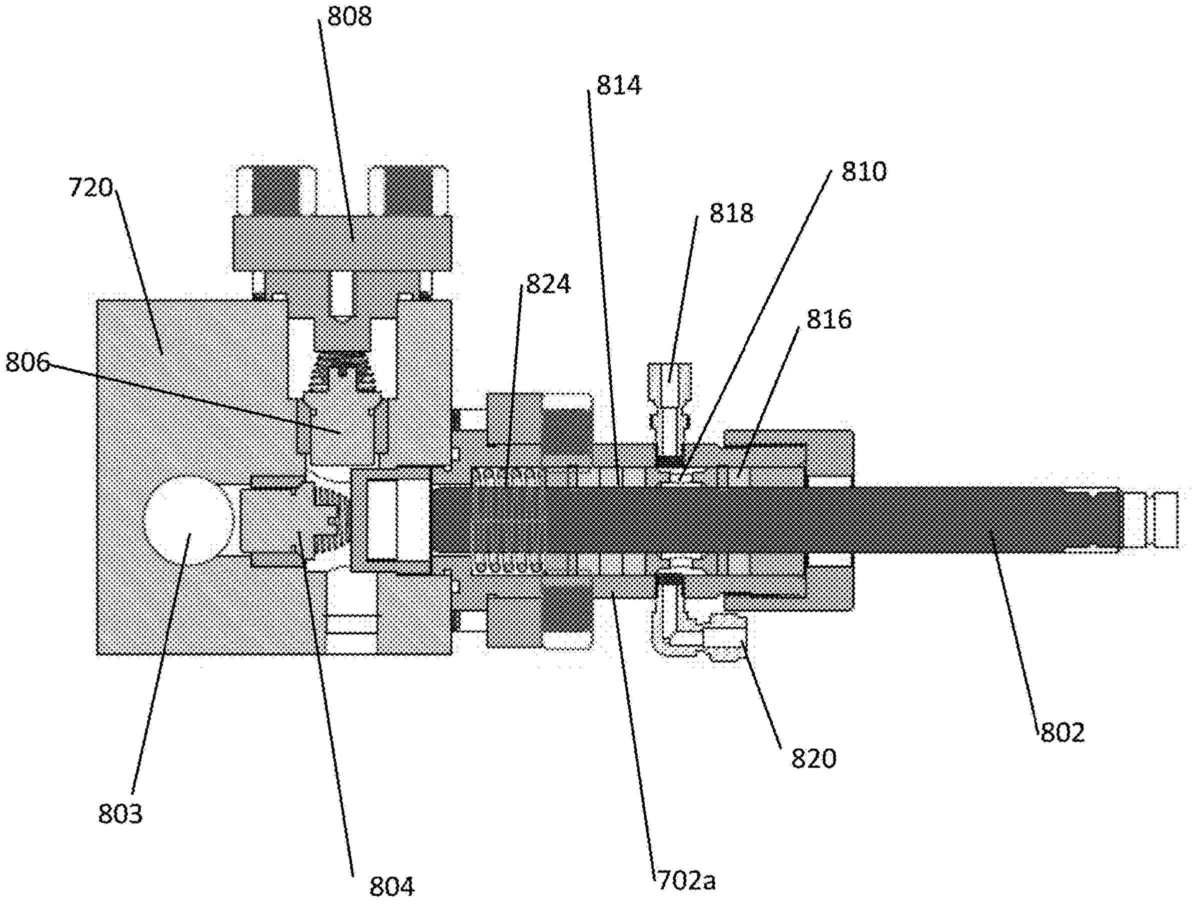
FIG. 8 illustrates aspects of the modified high-pressure pump of FIG. 7 in cross section.

FIG. 8 illustrates a cross-sectional view of a portion of the triplex pump 702 of FIG. 7, including cylinder 720, plunger 802, fluid inlet 803, inlet valve assembly 804, outlet valve assembly 806 and discharge valve cover 808. Also illustrated is a fluid barrier seal defining an annular chamber 810 formed between an inner surface of the stuffing box 702*a* and an outer surface of the plunger 802. The annular chamber 810 is in fluid communication with a chamber outlet 818 and a chamber inlet 820. As discussed previously, low temperature pressurized fluid, such as from a fluid tank or the booster pump, may be circulated though the annular chamber 810, such as via the barrier fluid manifold 704, while the booster pump 500 is operating. The annular chamber 810 may be, and preferably is, located between an inboard seal system 814 and an outboard seal system 816.

Figure 9:
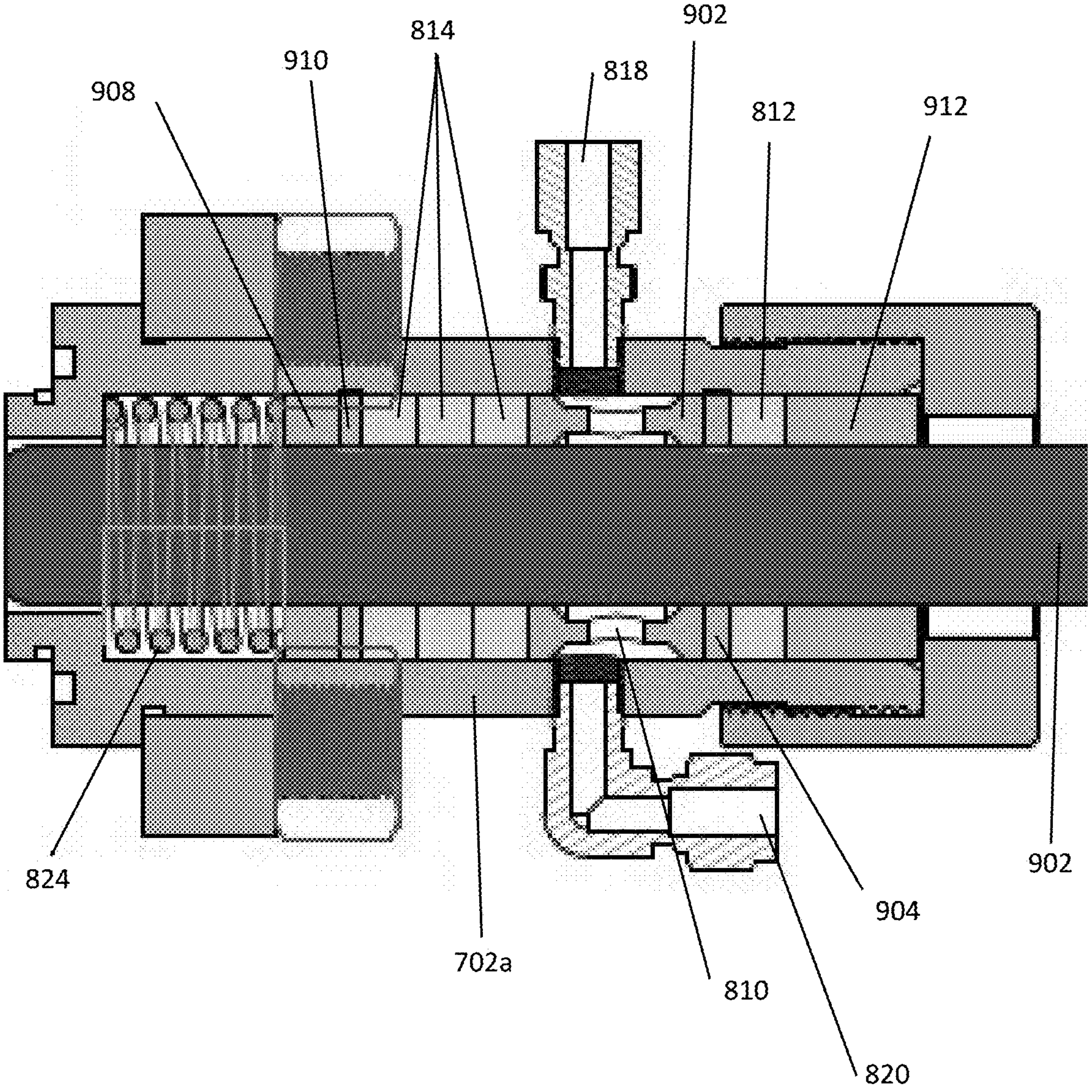
FIG. 9 illustrates additional aspects of the modified high-pressure pump of FIG. 7 in cross section.

FIG. 9 illustrates a barrier fluid seal system in more detail comprising an annular chamber 810 formed between the stuffing box, e.g., 702*a* and the plunger 902. The annular chamber 810 may be formed by enlarging the stuffing box 702*a* inside diameter surface in this area, or, more preferably, by providing a chamber insert or lantern ring 902 illustrated in FIG. 10.

A chamber insert 902 may be fabricated from a variety of materials including stainless steel or PEEK. The insert 902 may have an inboard end configured to contact the inboard seal system 814, and insert 902 may have an outboard end configured to contact an interference ring 904 and the outboard seal system 812 It is preferred that the chamber insert 902, and preferably the inboard portion of the insert 902, not form a fluid seal with the inside surface of the stuffing box 702*a* or the plunger 802 to allow high pressure fluid leaking past the inboard seal system 814 to enter the chamber 810.

Additionally, and/or optionally, the outside surface of the insert 902 may be tapered with a reducing diameter toward the inboard end to facilitate channeling of any leaks into the chamber 810. Further, if desired, an outside diameter portion of the insert 902 adjacent the outboard seal system 812 may have an interference fit with the inside surface of the stuffing box 702*a*-702*c* to fix the insert 902 in position relative to the seal systems and inhibit leaking into the outboard seal system 812.

As illustrated in FIG. 9, a preferred embodiment of the stuffing box 702*a* seal systems comprise a biasing spring 824 that compresses the seal components together and against gland nut 906. One end of the spring 824 reacts against the stuffing box housing and the other end reacts against a primary packing bushing 908, which may be formed from a metal alloy. The bushing 908 presses against a primary interference ring 910 that preferably has an interference fit with both the bore of the stuffing box and the plunger. Next, the interference ring 910 compresses one or more primary packing seals 814, which seals may be conventional packing seals. Moving to the outboard end of the stuffing box, the gland nut 906 may threadingly engage the stuffing box to compress a secondary bushing 912 against one or more secondary packing seals 812, which seals may be conventional packing seals. The packing seal 812 may compress against a secondary interference ring 904. Disposed between the secondary interference ring 904 and the primary seal(s) 814 is barrier insert 902.

Figure 10:
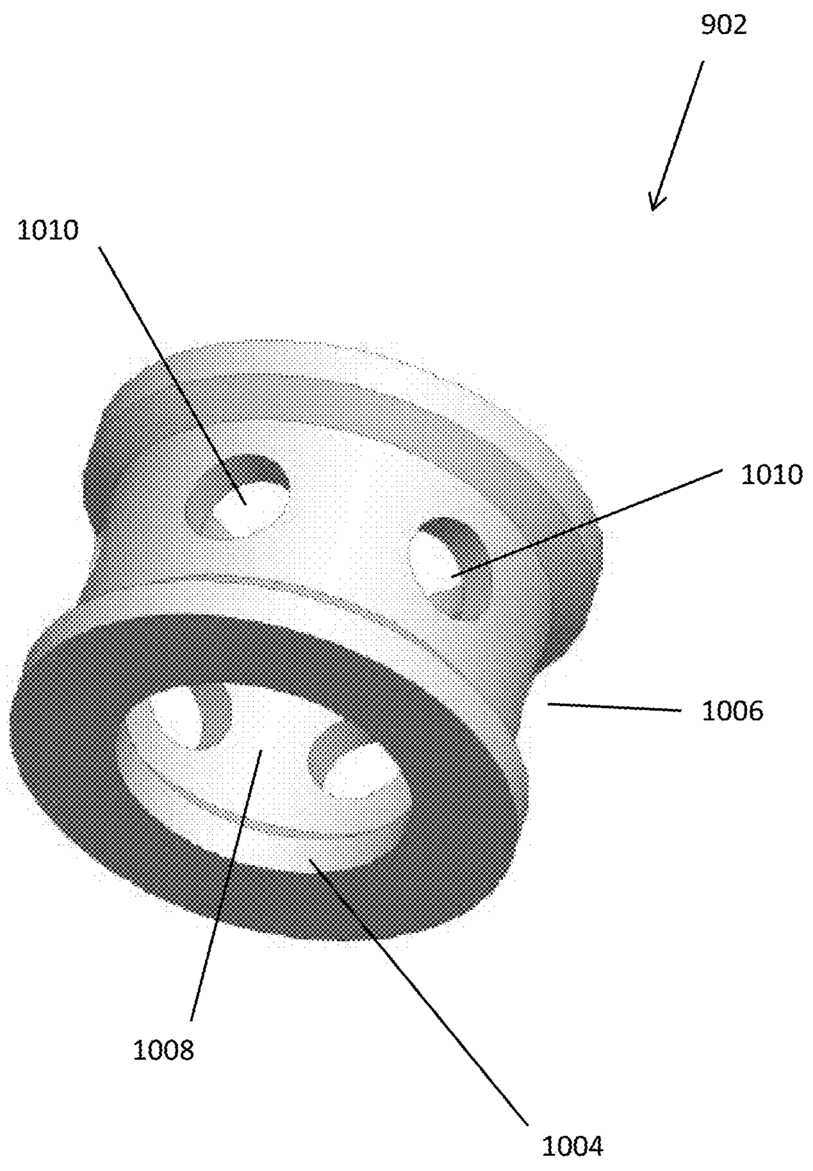
FIG. 10 illustrates an embodiment of barrier seal insert suitable for use with the present inventions.

As illustrated in FIG. 10, the insert 902 has a through bore defined by an inside diameter surface 1004, as described above. The annular chamber 810 is formed by an outer region 1006 formed between an inside surface of the stuffing box and an outer portion of the insert 902, and by an inner region 1008 formed between an outer surface of the plunger 802 and an inner portion of the insert 902. One or more ports 1010 formed in the insert 902 allow fluid to flow between the outer region 1006 and inner region 1008. When disposed within the stuffing box 802*a*-802*c* as shown in FIG. 9, the chamber inlet 820 and chamber outlet 818 fluidly communicate with the chamber 810.

As fluid circulates through the annular chamber 810, the low-pressure fluid cools the plunger 802 and stuffing box, or at least that portion of the plunger and stuffing box in contact with the fluid, and other pump components. If high-pressure fluid from the cylinder 720 leaks past the primary sealing system 910, 814, the low-pressure fluid (e.g., from the booster pump) keeps the annular chamber 810 above the vapor pressure of the high-pressure fluid. High pressure leaks are entrained in the circulating low-pressure fluid and returned to the tank 102. In this way, conditions in which the high-pressure fluid (e.g., water) is allowed to lower below its vapor pressure and flash to steam within the system is avoided or at least minimized. The outboard sealing system 904, 812 functions to seal the barrier chamber 810 from the outside environment. This is very different from conventional reciprocating plunger pumps in which water is allowed to continually leak over the "packing" to maintain the cooling of the plunger.

It is preferred that the volume or flow rate of barrier fluid continuously flowing through the seal chamber 810 is significantly more than the volume or flow rate of any anticipated leak. For example, it is preferred that the barrier fluid flow rate be about 50 times to about 75 times or even 100 times the anticipated leak flow rate. If a leak rate through or across the inboard seal system is estimated to be about 0.5 ml/sec, then the barrier fluid flow rate through the chamber 810 is preferred to be about 0.5 gpm (1.9 l/min). So, for a triplex pump as described above with three plungers, a flow rate of about 1.5 gpm (5.7 l/min) from the booster pump to the barrier fluid manifold 804 would be needed. A large barrier fluid flow rate compared to a leak rate helps ensure that any leaking heated fluid will be captured by the circulating fluid and quenched so that it doesn't flash to steam if released from the system.

Preferably, the inboard seal system and the outboard seal system may each comprise PEEK composite material seals manufactured as an interference fit with the bore of the stuffing box 702*a*-702*c* and with the plunger 802. PEEK is a suitable seal material because of its tolerance of the low lubricity of water and its ability to tolerate temperature swings from ambient to about 350° F. (177° C.) or more. Once the high-pressure pump 700 begins operation, such as during a manufacturer break-in or quality control process, the interference fit with the plunger 802 wears to a zero-clearance fit. For 1 inch (4 cm) diameter plungers, a diametrical interference of between about 0.0005 inch (½ mil or 12.7 μm) and about 0.001 inch (1 mil or 25.4 μm) is preferred. Next to the PEEK seal may be a plurality, and preferably two or three, rings of impregnated packing, which rings are tolerant of the pumping temperatures from ambient to about 350° F. or more. A seal system spring 824 provides constant pressure the maintains the integrity of both the inboard and outboard seal systems, as well as the barrier fluid chamber 810.

Figure 11:
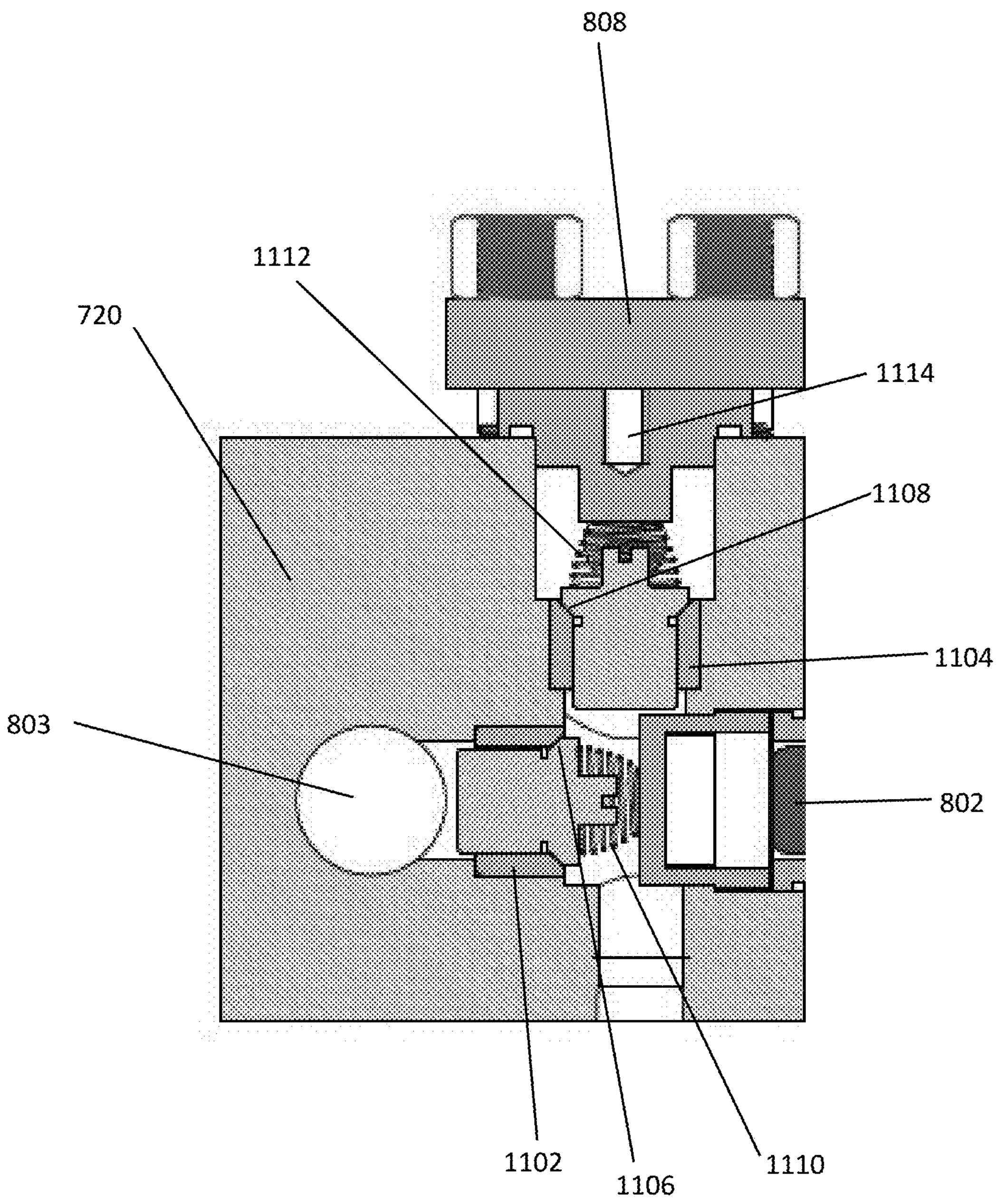
FIG. 11 illustrates further aspects of the modified high-pressure pump of FIG. 7 in cross section.

FIG. 11 illustrates the valve inlet and outlet assemblies in the pump 700. Inlet valve 804 and outlet valve 806, each comprising a stationary valve seat 1102, 1104, a valve body sealing surface 1106, 1108, and a biasing spring 1110, 1112.

It will be appreciated that as the plunger 902 retracts from the cylinder 820, lowered pressure in the cylinder 720 causes the inlet valve sealing surface 1106 to lift off its seat 1102 allowing fluid to enter the cylinder 720 from inlet 803. It is preferred that the inlet seating spring 1110 be modified or constructed to provide a minimum seating force (aka cracking force) to minimize the differential pressure across the valve seat 1102 on opening. Minimizing the cracking force helps to ensure that the fluid, especially heated fluid, at the fluid inlet 803 remains pressurized above its vapor pressure. For example, and not limitation, for the Heritage Pump Company Model HT-28 mentioned above, an inlet seating spring 1106 preferably is a conical or beehive type spring having a variable spring rate so that the initial or cracking force is low, but the return force is greater that the cracking force to ensure rapid seating of the valve. For example, if the inlet and outlet valve assemblies have a pressure surface area of about 0.6 $in^2$ (0.387 $mm^2$), then an inlet fluid pressure of about 125 psig (862 kPa) will generate an opening force of about 75 $lb_f$ (334 N). A biasing spring with about 5 $lb_f$ (22 N) to about 7 $lb_f$ (31 N) of seating force may be used to provide a minimum cracking force.

Similarly, it is preferred that the outlet seating spring 1112 be modified or constructed to provide a minimum seating force (aka cracking force) to minimize the differential pressure across the valve seat on opening. Minimizing the cracking force helps to ensure that the high-pressure fluid is effectively instantaneously passed through the outlet valve assembly 806 and that pressurized fluid, especially heated pressurized fluid at the fluid outlet 1114 remains pressurized above its vapor pressure. For example, and not limitation, for the Heritage Pump Company Model HT-28 mentioned above, an outlet seating spring 1106 preferably is a conical or beehive type spring having a variable spring rate so that the initial or cracking force is low but the return force is greater to ensure rapid seating of the valve. For a high pressure pump with an exit pressure of about 3,500 psig (24 MPa), an outlet spring with about 5 $lb_f$ (22 N) to about 7 $lb_f$ (31 N) of seating force may be used to provide a minimum cracking force.

Figure 12:
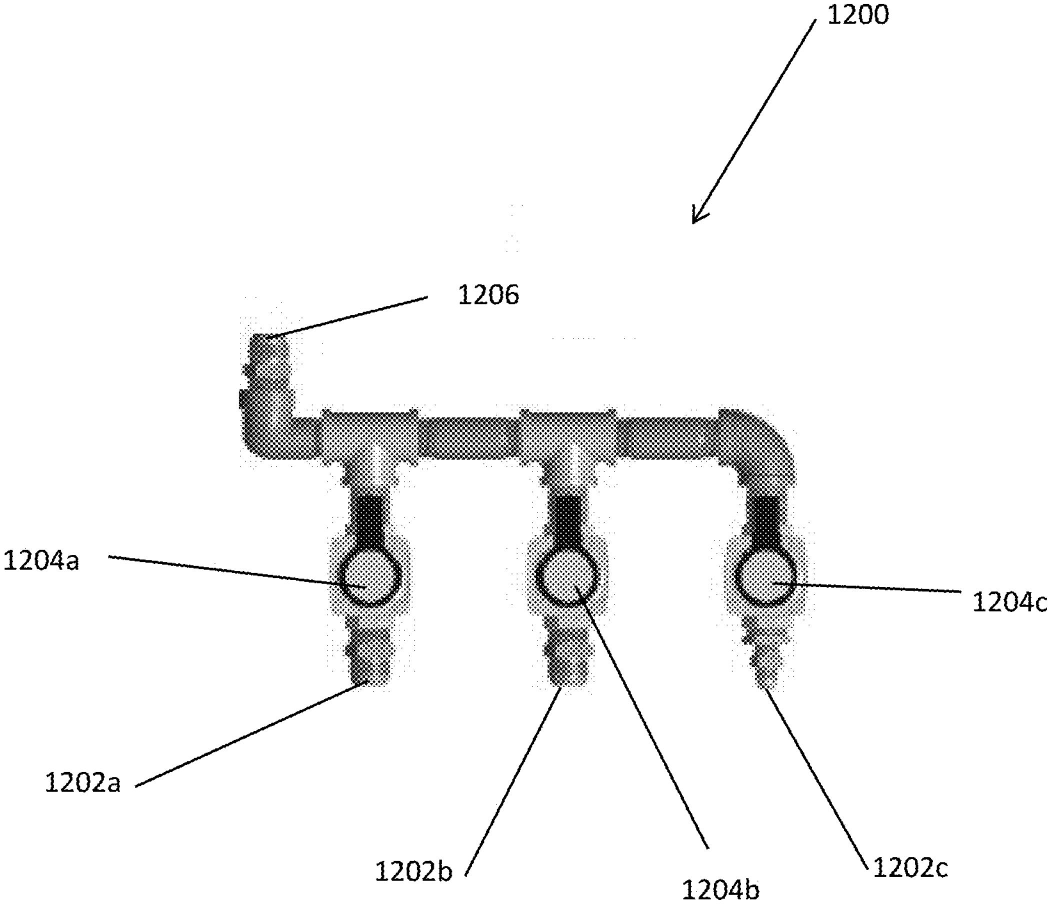
FIG. 12 illustrates a discharge manifold suitable for use with the present inventions.

FIG. 12 illustrates a manifold 1200 comprising a common inlet 1206 configured to receive fluid from the high pressure pump 800 and three controllable outlets 1202*a*, 1202*b* and 1202*c*. It is preferred that fluid flow through each outlet be controlled by a valve 1204*a*, 1204*b* and 1204*c*. The valves may be manual valves, such as a ball valve, or a solenoid pilot valve, or combinations of manual and controllable valves. It is preferred that the valves 1204*a*, 1204*b* and 1204*c* be controllable solenoid valves that electrically or controllably communicate with controller 160.

Figure 13A:
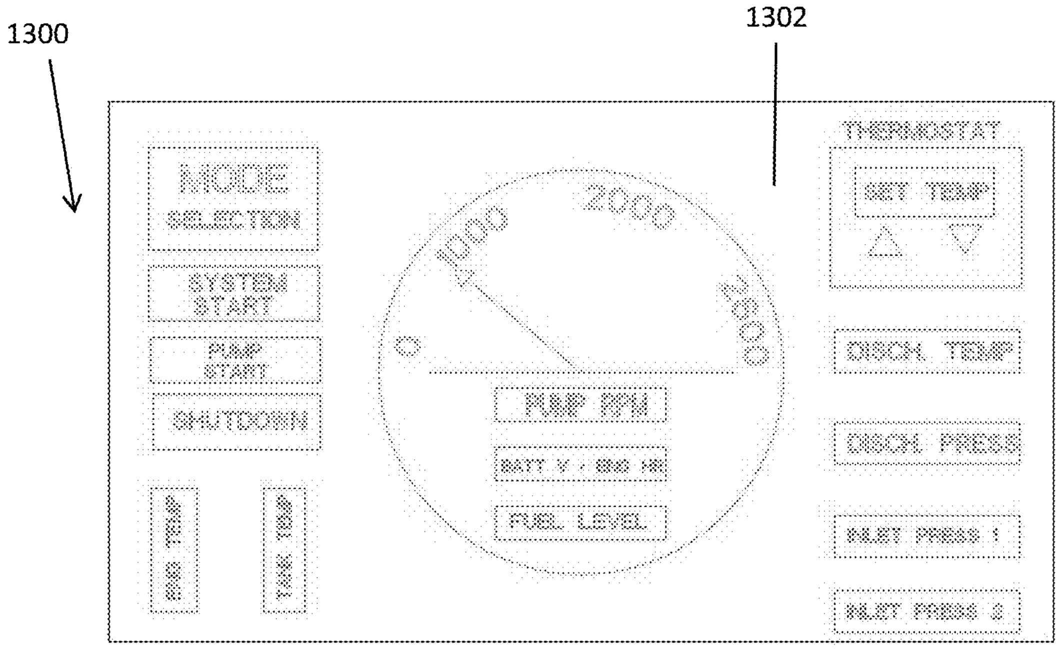
FIGS. 13A and 13B illustrate a human interface device suitable for use with the present inventions.
Figure 13B:
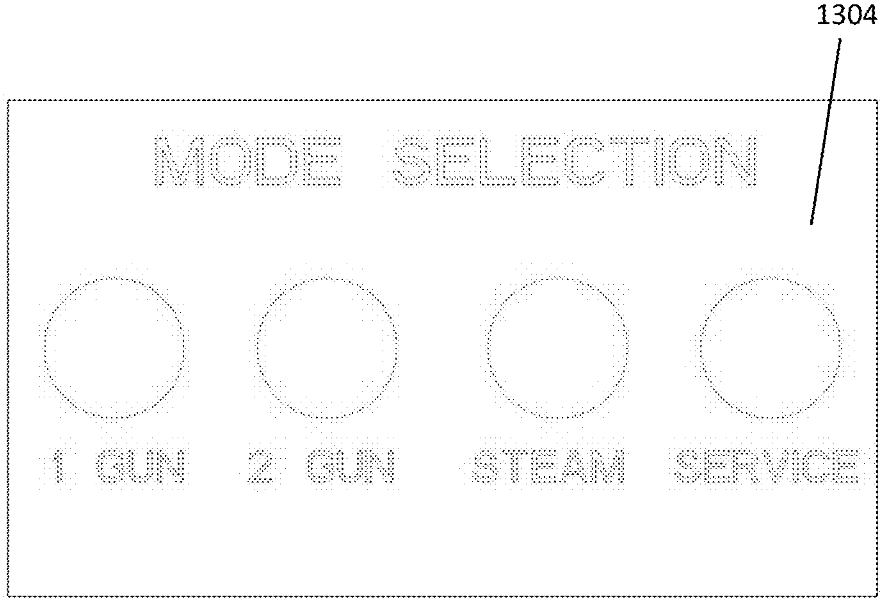

FIGS. 13A and 13B illustrate one of many possible human interface devices or displays 1300 suitable for use with embodiments of our inventions. FIG. 13 illustrates a first screen 1302 that may display engine data, such as RPM, engine temperature, battery voltage, engine hours, and fuel level. Screen 1302 also may comprise selection icons or buttons that toggle to other screens such as a Mode selection screen 1304. Screen 1302 also may comprise function icons or buttons, such as system start, pump start and shutdown. Screen 1302 also may comprise data displays such as discharge pressure and temperature from the high-pressure pump, and the inlet pressure to the heater and the inlet pressure to the high-pressure pump. A Service Mode selection screen may also be provided, which lists all power source parameters.

Mode selection screen 1304 illustrates five possible modes of operation of a system according to our invention.

One gun mode may comprise a (1) high temperature, high pressure mode of about 312° F. (156° C.) and about 5,000 psig (34 MPa) at about 10 gpm (37.9 l/min), or depending on the thermostat setting, a (2) low temperature, high pressure mode of less than 100° F. (38° C.) and about 5,000 psig (34 MPa) at about 10 gpm (37.9 l/min). Two-gun mode may comprise a (3) high temperature, high pressure mode of about 200° F. (93° C.) at about 5,000 psig (34 MPa) and less than about 10 gpm (37.9 l/min) for both guns, or depending on the thermostat setting, a (4) low temperature, high pressure mode of less than 100° F. (38° C.) and about 5,000 psig (34 MPa) and less than about 10 gpm (37.9 l/min) for both guns. The steam mode may comprise a (5) high temperature, low pressure mode of about 312° F. (156° C.) at about 200 psig (1,379 kPa) at about 10 gpm (37.9 l/min).

Once the power source is energized, such as by starting a Diesel engine and reaching operating temperature, the Mode selection screen is enabled, allowing the operating to select the desired mode. After mode selection, the operator may start the system, which energizes the booster pump to circulate cleaning fluid, such as water, through the heater, bypassing the high-pressure pump, to the manifold and back to the fluid tank, unless spray equipment is operated. Fluid is also circulated through the annular chamber of the barrier fluid seal, preferably regardless of whether the high pressure pump is energized. Once the operator is prepared to begin full operation of the system, a push button panel allows the operator to start the high-pressure pump, as required by the mode selected, which energizes the high-pressure pump, such as by energizing a hydraulic cylinder to engage a PTO. The engine may be operated along its entire range of RPMs from idle (about 800 RPM) to its maximum of about 2,400 RPM to generate the desired high pressure pump output pressure. For example, the operator may run the pump at about 1,170 RPM to generate 5 gpm of water flow, or at about 2,250 RPM to generate 10 gpm (37.9 l/min) of water flow. As of this point, the operator may choose to run one tool at 5 gpm (19 l/min) or two tools at 10 gpm (38 l/min).

Should the operator wish to add heat to the water, the operator would then turn the heating system to the ON position. The operator has the ability to set the system's thermostat to the desired discharge temperature, ranging from about 125° F. (52° C.) to about 325° F. (163° C.). As the system is operated between its full flow of 10 gpm (37.9 l/min) and may cycle between one tool or two, the manifold bypass valve or dump valve will send any excess high-pressure water back to the water tank.

To generate low pressure wet steam, the operator can select the "WetSteam" push button, which will automatically switch the controllable valves to the bypass position so that the high-pressure pump is bypassed, and the high-pressure pump PTO is disengaged. In this mode, the operator may select a temperature of 325° F. (163° C.) on the thermostat and operate the system at low pressure of about 100 psig (689 kPa) to about 150 psig (1,034 kPa).

While operation of an embodiment with a controller has been described, those of skill that have benefit of this disclosure will appreciate that manual operation of embodiment may implemented in similar fashion.

Figure 14A:
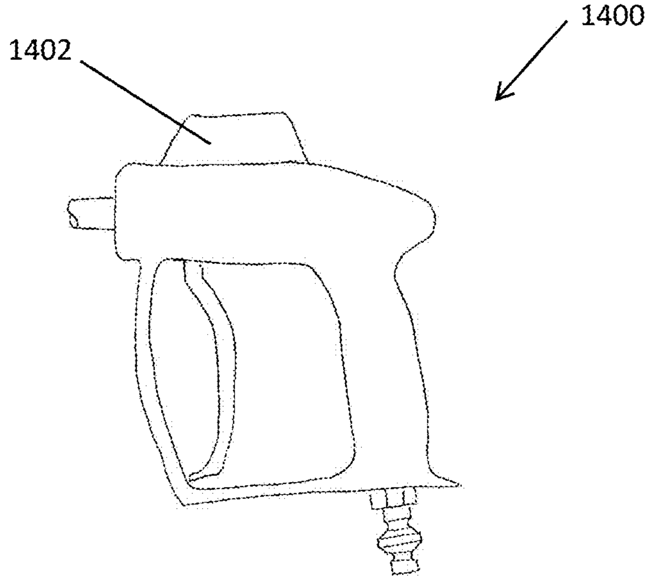
FIGS. 14A and 14B illustrate an embodiment of pressure washing equipment suitable for use with the present inventions.
Figure 14B:
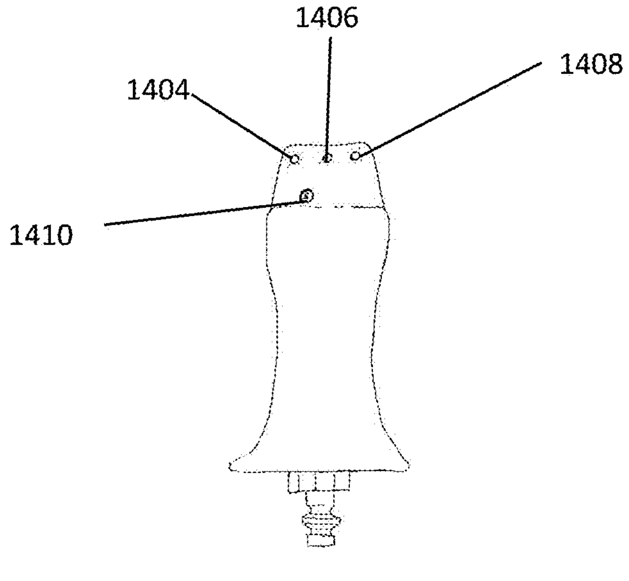

It will be appreciated that use of our invention may require that the operator (i.e., the worker holding the pressure wand or lance) may be a significant distance from the system, such as greater than 50 feet and upwards of hundreds of feet. Thus, it is contemplated that pressure wands, lances and other discharge equipment comprise one or more information and/or safety features. For example, in a first embodiment, a pressure wand may comprise a plurality of visual displays, such as LEDs, to indicate the temperature of the fluid, the pressurization of the fluid, fluid level in the tank, fuel level in the tank, and/or operation condition of the power source. FIGS. 14A and 14B illustrates a pressure wand handle 1400 comprising a communication component 1402 having a plurality of visual indicators or displays 1404, 1406, 1408, a safety feature 1410, a power source, such as a rechargeable or replaceable battery, a transmitter/receiver for wireless communication and processing or logic circuitry. The indicators may comprise LEDs, one for fluid temperature 1404, such as temperature fluid leaving the heater, one for fluid pressurization 1406, such as fluid pressure at the manifold and one for fluid level 1408, such as fluid level in the tank. If the operator has set the fluid temperature thermostat to 250° F. (121° C.) and the fluid pressurization to 4,000 psig (27.6 MPa), the temperature and pressure LEDs may display a "green" indication as long as the fluid temperature and pressure are within a desired range, such as for example ±10% of the set points. If the fluid parameter deviates, such as the heater becoming compromised, outside of the acceptable range, the appropriate LED may change its appearance to "yellow" or "red" to inform the operator of the changed condition(s). The same type of alerts could be implemented for other system parameters such as oil pressure, barrier fluid temperature, fuel level, etc. . . . It will be appreciated that FIG. 14B illustrates the view of the equipment 1400 as easily seen by the operator. Also illustrated in FIG. 14B is a safety feature 1410 such as a switch that can be activated by the operator to de-energize the high pressure pump, de-energize the heater, return the engine to idle, or de-energize the power source. Embodiments may include a plurality of visual indicators and safety features. It is preferred that the communications module 1402 communicates wirelessly with the controller associated with the system, but we also contemplate wired communication along the pressure hose feeding the equipment 1400.

Having now disclosed several embodiments of our inventions, it will be appreciated that stationary power sources other than Diesel engines may be employed. For example, natural gas, or gasoline internal combustion engines may be utilized as well as gas turbine engines. These power sources may be used to directly drive the high-pressure pump, and hydraulic pumps, or they may drive an electrical generator to power electric motors to drive the booster and high-pressure pumps. Furthermore, the power source can be an electric motor such as a DC motor or a variable frequency drive AC motor or motors that directly drive the pumps.

It will now also be appreciated that fluid heaters other than a direct fired Diesel heater may be used to great effect. For example, when an internal combustion engine is used as the power source, waste heat from for example, the exhaust gases may be captured by an air to fluid heat exchanger to heat the fluid. Also waste heat from the engine coolant system may be captured with a fluid-to-fluid heat exchanger for the same purpose. The additional sources of heat can be used to reduce the size of or entirely replace the primary heater. If an electrical generator set is used to provide electrical power rather than mechanical power, or if direct grid power is used, the heater may comprise an electric heater or boiler, such as an inductance heater.

Persons of skill having the benefit of this disclose will now understand how to mix and match these various components disclosed herein to create other and further embodiments of our inventions. Further, the various methods and embodiments of the methods of manufacture and assembly of the system, as well as location specifications, can be included in combination with each other to produce variations of the disclosed methods and embodiments. Discussion of singular elements can include plural elements and vice versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

The invention claimed is:

1. A method of generating pressurized fluid, comprising:
- pressurizing fluid with a first fluid pump to increase a fluid pressure to a first pressure or a first pressure range;
- coupling a heat exchanger to the first pump capable of increasing a temperature of the fluid pressurized by the first pump to a second temperature or a second temperature range;
- pressurizing fluid from the first pump or from the heat exchanger with a second fluid pump to a second pressure or second pressure range greater than the first pressure or first pressure range;
- circulating fluid from the first pump into at least a portion of the second pump without the second pump pressurizing the circulated fluid; and
- generating fluid selected from the group: (1) fluid pressurized by the first fluid pump only; (ii) fluid pressurized by the first fluid pump and heated by the heat exchanger but not pressurized by the second pump; (iii) fluid pressurized by the first and second fluid pumps but not heated by the heat exchanger; and (iv) fluid pressurized by the first fluid pump, heated by the heat exchanger, and pressurized by the second pump.

2. The method of claim 1, comprising providing a heat exchanger bypass having one or more valves to communicate unheated fluid from the first fluid pump to the second fluid pump bypassing the heat exchanger.

3. The method of claim 1, comprising providing a second pump bypass conduit having one or more valves to communicate fluid from the heat exchanger bypassing the second fluid pump.

4. The method of claim 1, comprising providing a heat exchanger bypass having one or more valves to selectably communicate unheated fluid from the first fluid pump to the second fluid pump bypassing the heat exchanger, and providing a second pump bypass having one or more valves to selectably communicate unheated fluid from the first fluid pump or heated fluid from the heat exchanger to pressure washing equipment bypassing the second fluid pump.

5. The method of claim 1, comprising discharging fluid to pressure washing equipment by actuating one or more valves.

6. The method of claim 1, comprising providing an insert for the second fluid pump that defines a central bore for receiving a reciprocating second fluid pump plunger, and an annular chamber around the plunger for receiving fluid from the first pump.

7. The method of claim 6, comprising not forming a seal between at least a portion of the insert and an inner surface of the second pump.

8. The method of claim 1, wherein the second pump comprises a triplex pump with three stuffing boxes in which each stuffing box comprises a reciprocating plunger and a barrier chamber sized such that unheated fluid from the first pump flows through the barrier chamber to cool at least the plunger associated with the stuffing box.

9. The method of claim 1, comprising providing a controller having a communication component, a memory component, a display component, and processing component.

10. The method of claim 1, comprising transducing temperature of fluid between the first fluid pump and the heat exchanger, and transducing pressure of fluid between the second fluid pump and pressure washing equipment.

11. The method of claim 9, comprising the controller receiving data transduced by one or more temperature, pressure or level sensors.

12. The method of claim 11, comprising the controller communicating one or more control signals based on transduced data received by the controller to the first fluid pump, the heat exchanger, the second fluid pump or a controllable valve.

13. The method of claim 1, comprising providing washing equipment capable of being held by an operator during use and providing one or more status indicators on the washing equipment visible to the operator.

14. The method of claim 13, wherein the status indicators comprise light emitting diodes indicating the status of one or more of: fluid level, pressurized fluid temperature, and fluid pressure.

15. The method of claim 1, comprising providing a fluid tank coupled to the first fluid pump, the tank having a fluid inlet valve, a fluid temperature sensor, and a fluid level sensor.

16. The method of claim 1, comprising arranging on a trailer a fluid tank, the first fluid pump, the heat exchanger, and the second fluid pump.

17. The method of claim 16, further comprising on the trailer a Diesel engine for supplying hydraulic, rotational and/or electric power, a Diesel-fired heater, and a Diesel fuel tank.

18. The method of claim 17, comprising supplying hydraulic power for the first pump, rotational power for the second pump, and electric power.

19. A method of generating pressurized fluid, comprising:
- drawing fluid from a source with a first pump;
- pressurizing the fluid with the first pump to a first pressure or a first pressure range;
- providing a fluid heater capable of increasing a temperature of the fluid pressurized by the first pump to a second temperature or second temperature range;
- pressurizing with a second pump fluid from the first pump or fluid from the fluid heater to a second pressure or second pressure range greater than the first pressure or first pressure range;
- the second pump comprising a pump plunger and a barrier seal forming an annular chamber around a portion of the plunger;
- providing a fluid heater bypass that selectably communicates fluid from the first pump to the second pump bypassing the fluid heater;

providing a second pump bypass that selectably communicates fluid bypassing the second pump;

circulating fluid from the first pump into the annular chamber of the barrier seal and back to the fluid source;

providing a controller operatively coupled to the first pump, the fluid heater, the second pump, the first pump bypass, the second pump bypass, to generate fluid selected from the group: (1) fluid pressurized by the first fluid pump only; (ii) fluid pressurized by the first fluid pump and heated by the heat exchanger but not pressurized by the second pump; (iii) fluid pressurized by the first and second fluid pumps but not heated by the heat exchanger; and (iv) fluid pressurized by the first fluid pump, heated by the heat exchanger, and pressurized by the second pump.

20. The method of claim 19, comprising providing pressure washing equipment capable of being held by an operator during use and providing one or more status indicators on the washing equipment visible to the operator indicating the status of one or more of: fluid level, fluid temperature, and fluid pressure.

21. A method of generating pressurized fluid, comprising:

pressurizing fluid with a first fluid pump to increase a fluid pressure to a first pressure or a first pressure range;

coupling a heat exchanger to the first pump capable of increasing a temperature of the fluid pressurized by the first pump to a second temperature or a second temperature range;

pressurizing a first portion of unheated fluid from the first pump or heated fluid from the heat exchanger with a second fluid pump to a second pressure or second pressure range greater than the first pressure or first pressure range;

circulating a second portion of unheated fluid from the first pump into at least a portion of the second pump without the second pump pressurizing the second portion of the unheated fluid; and generating fluid selected from the group: (1) fluid pressurized by the first fluid pump only; (ii) fluid pressurized by the first fluid pump and heated by the heat exchanger but not pressurized by the second pump; (iii) fluid pressurized by the first and second fluid pumps but not heated by the heat exchanger; and (iv) fluid pressurized by the first fluid pump, heated by the heat exchanger, and pressurized by the second pump.

22. A method of generating pressurized fluid, comprising:

pressurizing fluid with a first fluid pump to increase a fluid pressure to a first pressure or a first pressure range;

coupling a heat exchanger to the first pump capable of increasing a temperature of the fluid pressurized by the first pump to a second temperature or a second temperature range;

pressurizing fluid from the first pump or from the heat exchanger with a second fluid pump to a second pressure or second pressure range greater than the first pressure or first pressure range;

providing an insert for the second fluid pump that defines a central bore for receiving a reciprocating second fluid pump plunger, and an annular chamber around the plunger for receiving fluid from the first pump; and generating fluid selected from the group: (1) fluid pressurized by the first fluid pump only; (ii) fluid pressurized by the first fluid pump and heated by the heat exchanger but not pressurized by the second pump; (iii) fluid pressurized by the first and second fluid pumps but not heated by the heat exchanger; and (iv) fluid pressurized by the first fluid pump, heated by the heat exchanger, and pressurized by the second pump.

23. The method of claim 22, further comprising circulating unheated fluid from the first fluid pump into the annular chamber.

24. The method of claim 23, further comprising circulating fluid from the annular chamber to a fluid tank from which fluid is drawn by the first fluid pump.

* * * * *